(12) United States Patent
Paffenholz et al.

(10) Patent No.: US 11,009,619 B2
(45) Date of Patent: *May 18, 2021

(54) 3D TAU-P COHERENCY FILTERING

(71) Applicant: Magseis FF LLC, Houston, TX (US)

(72) Inventors: Josef Paffenholz, Sugar Land, TX (US); Kenneth L. Craft, Sugar Land, TX (US)

(73) Assignee: Magseis FF LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/991,816

(22) Filed: Aug. 12, 2020

(65) Prior Publication Data

US 2020/0371263 A1 Nov. 26, 2020

Related U.S. Application Data

(63) Continuation of application No. 15/870,193, filed on Jan. 12, 2018, now Pat. No. 10,754,051.

(Continued)

(51) Int. Cl.
*G01V 1/36* (2006.01)
*G01V 1/28* (2006.01)
(Continued)

(52) U.S. Cl.
CPC ............ *G01V 1/368* (2013.01); *G01V 1/288* (2013.01); *G01V 1/32* (2013.01); *G01V 1/3808* (2013.01);
(Continued)

(58) Field of Classification Search
CPC ...... G01V 1/364; G01V 1/30; G01V 2210/32; G01V 2210/3246; G01V 2210/63; G01V 11/00

See application file for complete search history.

(56) References Cited

U.S. PATENT DOCUMENTS 4,760,563 A * 7/1988 Beylkin .................. G01V 1/32
367/43
4,953,139 A 8/1990 Laster et al.
(Continued)

FOREIGN PATENT DOCUMENTS

EP 2 610 645 7/2013

OTHER PUBLICATIONS

Chen, Yangkang, "Deblending Using a Space-Varying Median Filter" Article, Nov. 2, 2014, The University of Texas at Austin, USA (32 pages).

(Continued)

*Primary Examiner* — Elias Desta
(74) *Attorney, Agent, or Firm* — Foley & Lardner LLP; James De Vellis

(57) ABSTRACT

Systems and methods of performing a seismic survey are described. The system can receive seismic data in a first domain, and transform the seismic data into a tau-p domain. The system can identify a value on an envelope in the tau-p domain, select several values on the tau-p envelope using a threshold, and then generate a masking function. The system can combine the masking function with the tau-p transformed seismic data, and then perform an inverse tau-p transform on the combined seismic data. The system can adjust amplitudes in the inverse tau-p transformed combined seismic data, and identify one or more coherent events corresponding to subsea lithologic formations or hydrocarbon deposits.

20 Claims, 20 Drawing Sheets

Related U.S. Application Data

(60) Provisional application No. 62/445,879, filed on Jan. 13, 2017.

(51) Int. Cl.
   *G01V 1/32* (2006.01)
   *G01V 1/38* (2006.01)

(52) U.S. Cl.
   CPC .. *G01V 2210/3248* (2013.01); *G01V 2210/47* (2013.01)

(56) References Cited

U.S. PATENT DOCUMENTS

| | | | |
|---|---|---|---|
| 5,583,825 A * | 12/1996 | Carrazzone | G01V 1/306 367/31 |
| 6,721,662 B2 | 4/2004 | Wood | |
| 7,515,505 B2 | 4/2009 | Krohn et al. | |
| 7,639,564 B2 | 12/2009 | Paffenholz et al. | |
| 2008/0221801 A1 | 9/2008 | Craft et al. | |
| 2009/0180351 A1 | 7/2009 | Paffenholz et al. | |
| 2011/0276274 A1 | 11/2011 | Yu | |
| 2014/0219054 A1 | 8/2014 | Mousa et al. | |
| 2017/0248716 A1* | 8/2017 | Poole | G01V 1/28 |

OTHER PUBLICATIONS

International Preliminary Report on Patentability for PCT PCT/US2018/013564 dated Jul. 25 2019 (6 pages).

International Search Report and Written Opinion for PCT/US 18/13564 dated Apr. 6, 2018 (11 pages).

Mahdad et al., "Iterative method for the separation of blended seismic data: discussion on the algorithmic aspects", Wiley Online Library, May 22, 2012, retrieved Jan. 23, 2017 from URL: http://onlinelibrary.wiley.com/doi/10.1111/j.1365-2478.2012.01084.x/full (3 pages).

Non-Final Office Action for U.S. Appl. No. 15/870,193 dated Nov. 18, 2019 (7 pages).

Notice of Allowance for U.S. Appl. No. 15/870,193 dated Apr. 21, 2020 (8 pages).

Schonewille, Michel Albert, "Fourier Reconstruction of Irregular Sampled Seismic Data", Ph.D. Thesis, Technical University Delft, 2000 (259 pages).

Wang et al., "Seismic data interpolation by greedy local Radon transform", Geophysics, Nov.-Dec. 2010, vol. 75, No. 6, retrieved Jan. 23, 2017 from URL: http://library.seg.org/doi/full/10.11901/1.3484195 (5 pages).

Extended European Search Report for EP 18739109.9 dated Oct. 2, 2020 (11 pages).

First Office Action for CN Appln. Ser. No. 201880018179.X dated Dec. 25, 2020 (9 pages).

* cited by examiner

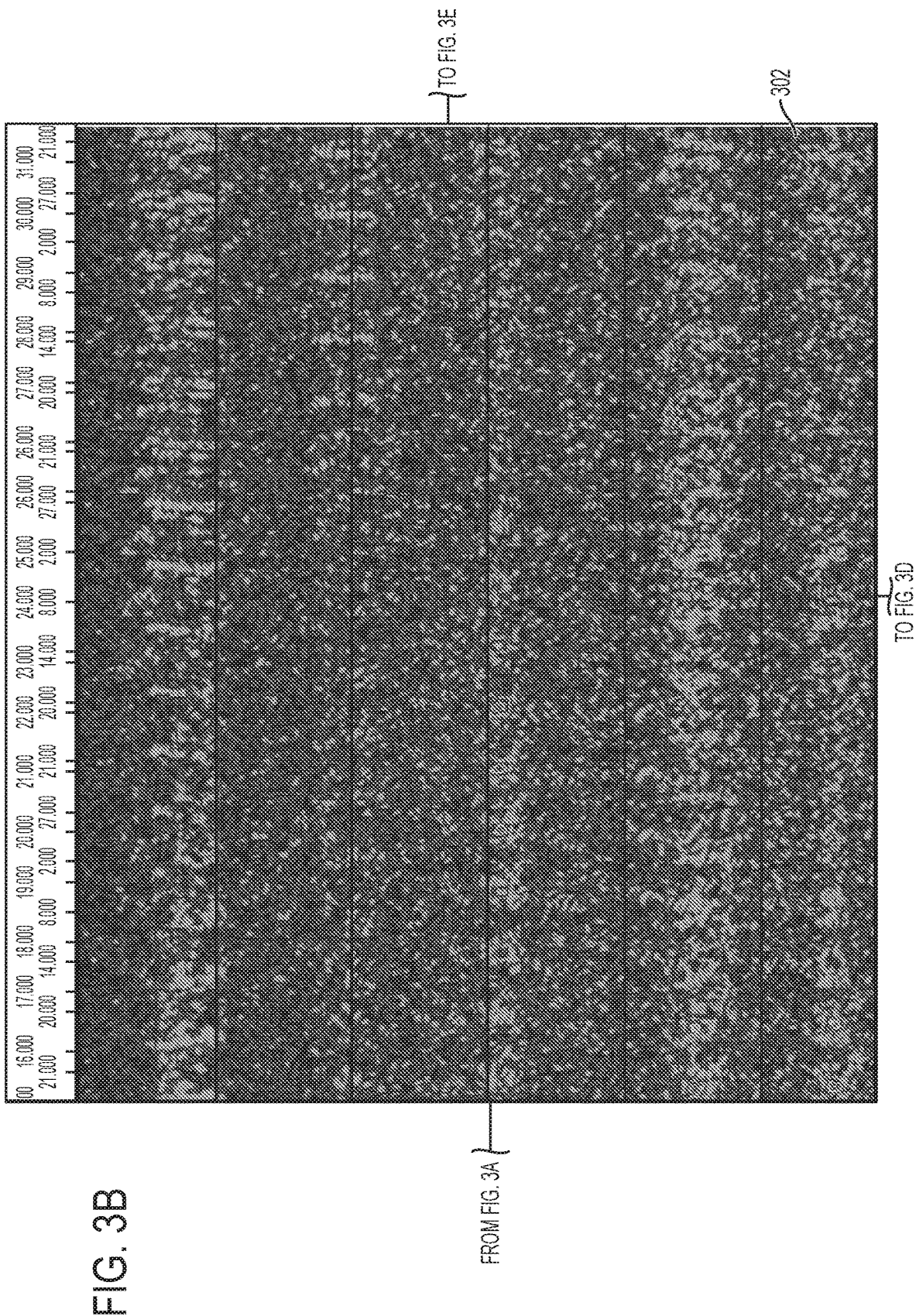

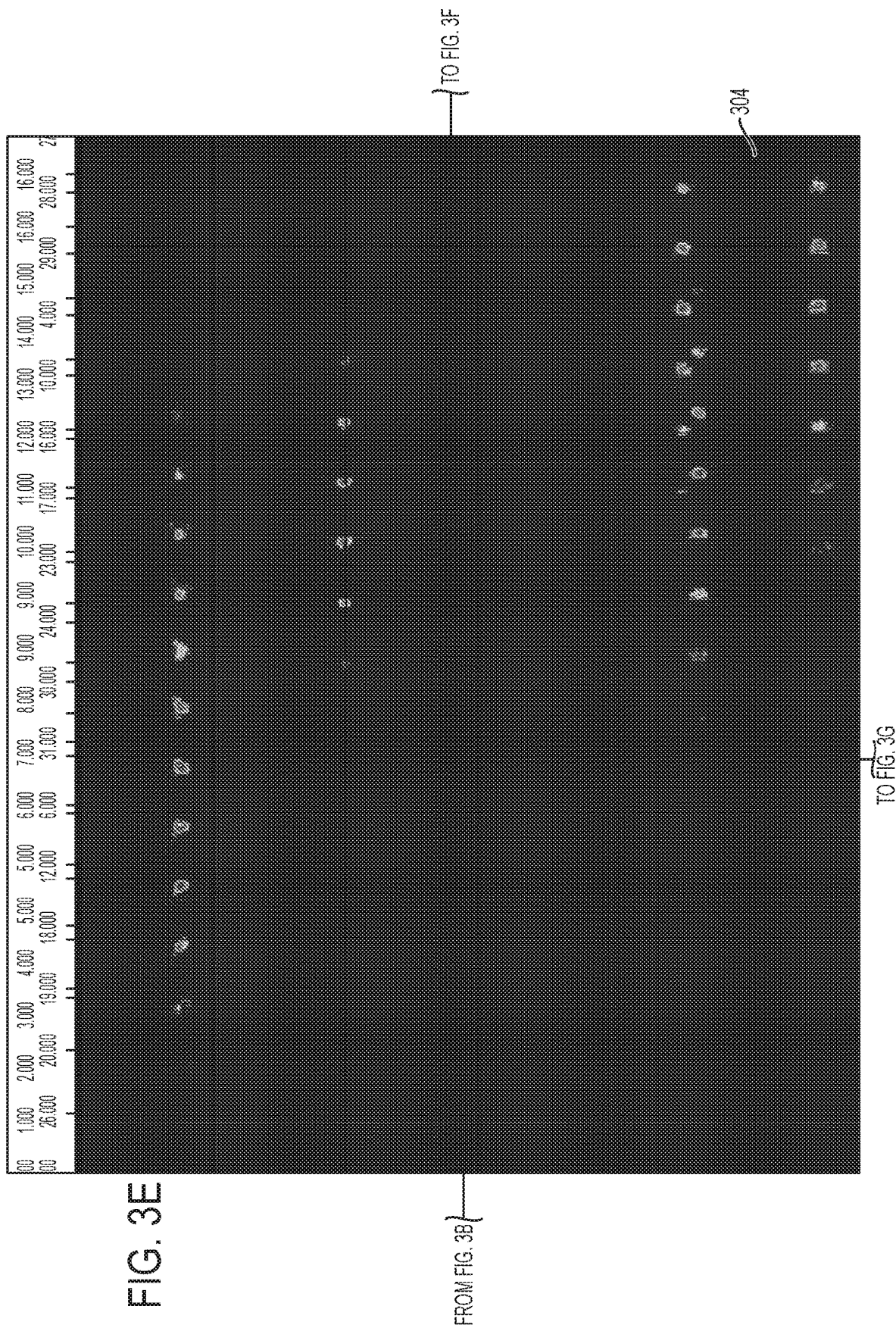

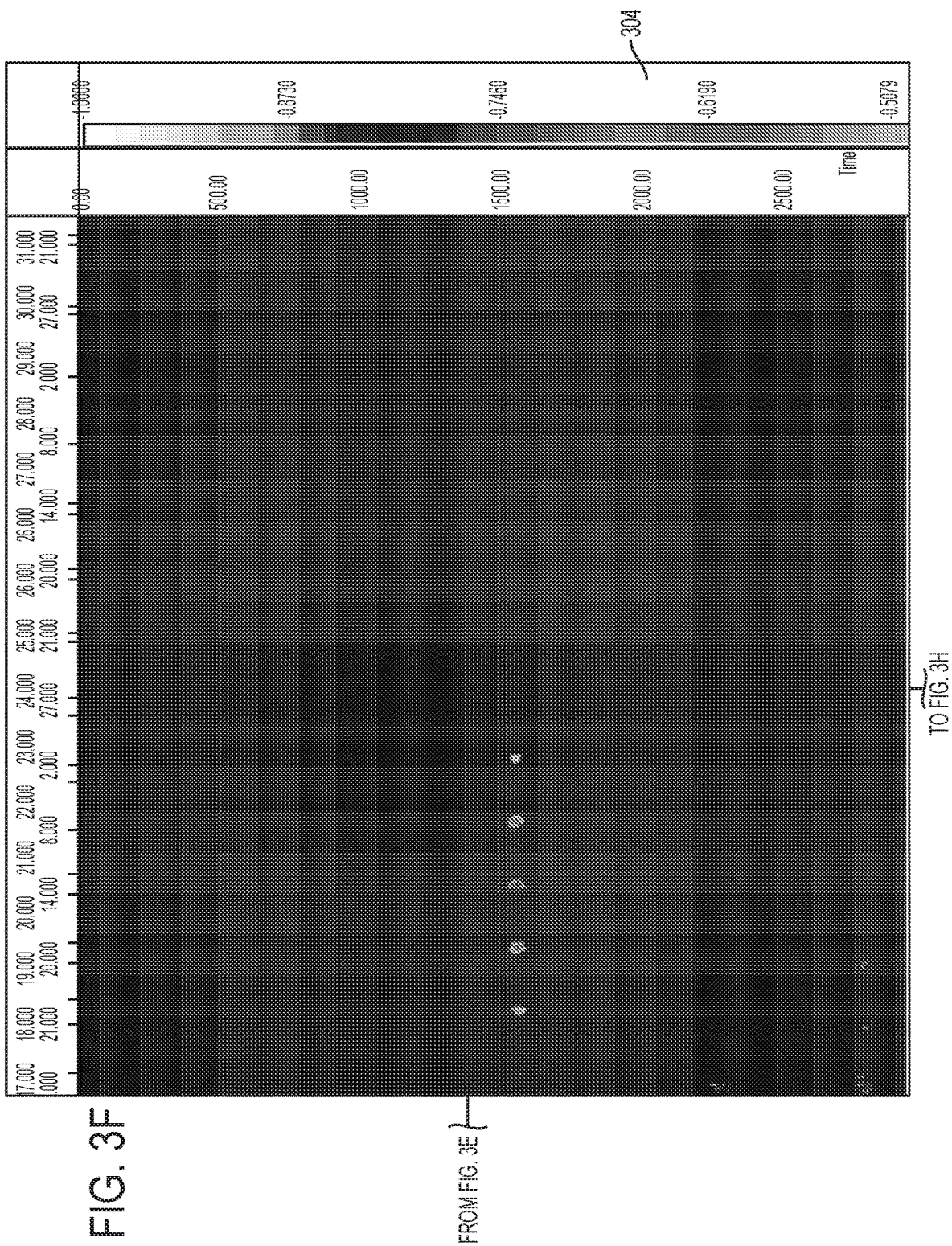

3D TAU-P COHERENCY FILTERING

CROSS-REFERENCE TO RELATED APPLICATIONS

This application claims the benefit of priority under 35 U.S.C. § 120 as a continuation of U.S. patent application Ser. No. 15/870,193, filed Jan. 12, 2018, now issued as U.S. Pat. No. 10,754,051, which claims the benefit of priority under 35 U.S.C. § 119 to U.S. Provisional Patent Application No. 62/445,879, filed Jan. 13, 2017, each of which is hereby incorporated by reference herein in its entirety.

BACKGROUND

A seismic data acquisition system can acquire seismic data relating to subsurface features, such as lithological formations or fluid layers that may indicate the presence of hydrocarbons, minerals or other elements. An acoustic signal can penetrate the surface of the earth. The acoustic signal can reflect or refract off of subsurface lithological formations. The reflected or refracted acoustic signals can be acquired, analyzed, and interpreted to indicate physical characteristics of, for example, the lithological formations such as the presence of hydrocarbons.

SUMMARY

The present disclosure is directed to systems and methods that provide a coherency filter component that receives seismic data in a domain and returns the coherent part of the seismic data while removing the incoherent part, such as noise. The underlying coherency filter component, or engine, can include a greedy type matching-pursuit linear 3D least-squares time-slowness ("tau-P" or "τ-p") transformation.

The coherency filter component can be configured with a τ-p transform that can improve the native handling of irregular spaced data, while reducing artifacts due to aliasing. Because of the anti-aliasing properties of the τ-p transform, the systems and methods of the present disclosure may or may not use the Normal Moveout Curve ("NMO").

The coherency filter component can perform de-noising, data regularization, data interpolation and multi-source acquisition de-blending of seismic data.

At least one aspect is directed to a system to perform a seismic survey. The system can include a data processing system having a coherency filter component, at least one processor, and memory. The data processing system can receive seismic data obtained via acoustic signals generated by at least one acoustic source and reflected from at least one subsurface lithologic formation. The data processing system can transform the seismic data to a tau-p domain, the tau-p domain comprising the seismic data decomposed as a series of lines that map to points in the tau-p domain. The data processing system can determine a tau-p envelope for the seismic data transformed to the tau-p domain. The data processing system can identify a first value on the tau-p envelope. The data processing system can select a threshold value based on the first value identified on the tau-p envelope. The data processing system can select a plurality of values on the tau-p envelope greater than or equal to the threshold. The data processing system can identify a masking function comprising a first default value for the plurality of values selected on the tau-p envelope, and a second default value different from the first default value. The data processing system can combine the seismic data in the tau-p domain with the masking function to generate combined seismic data. The data processing system can perform an inverse tau-p transform to the combined seismic data to generate an inverse combined seismic data. The data processing system can apply an adaptive filter to the inverse combined seismic data to correct the plurality of values selected on the tau-p envelope and generate corrected seismic data. The data processing system can identify one or more coherent events from the corrected seismic data that indicate one or more locations corresponding to a subsurface lithologic formation of the at least one subsurface lithologic formation.

At least one aspect is directed to a method of performing a seismic survey. The method can include the data processing system receiving seismic data obtained via acoustic signals generated by at least one acoustic source and reflected from at least one subsurface lithologic formation. The method can include the data processing system transforming the seismic data to a tau-p domain, the tau-p domain comprising the seismic data decomposed as a series of lines that map to points in the tau-p domain. The method can include the data processing system determining a tau-p envelope for the seismic data transformed to the tau-p domain. The method can include the data processing system identifying a first value on the tau-p envelope. The method can include the data processing system selecting a threshold value based on the first value identified on the tau-p envelope. The method can include the data processing system selecting a plurality of values on the tau-p envelope greater than or equal to the threshold. The method can include the data processing system identifying a masking function comprising a first default value for the plurality of values selected on the tau-p envelope, and a second default value different from the first default value. The method can include the data processing system combining the seismic data in the tau-p domain with the masking function to generate combined seismic data. The method can include the data processing system performing an inverse tau-p transform to the combined seismic data to generate an inverse combined seismic data. The method can include the data processing system applying an adaptive filter to the inverse combined seismic data to correct the plurality of values selected on the tau-p envelope and generate corrected seismic data. The method can include the data processing system identifying coherent events from the corrected seismic data that indicate one or more locations corresponding to a subsurface lithologic formation of the at least one subsurface lithologic formation.

At least one aspect is directed to a system to perform a seismic survey. The system can include a data processing system comprising a coherency filter component, at least one processor, and memory. The data processing system can receive seismic data obtained via acoustic signals generated by at least one acoustic source and reflected from at least one subsurface lithologic formation. The data processing system can transform the seismic data to a tau-p domain, the tau-p domain comprising the seismic data decomposed as a series of lines that map to points in the tau-p. The data processing system can determine a tau-p envelope. The data processing system can normalize the tau-p envelope. The data processing system can identify a value on the tau-p envelope. The data processing system can select a threshold value based on the value identified on the tau-p envelope. The data processing system can select a plurality of values on the tau-p envelope greater or equal to the threshold using a flood-fill technique. The data processing system can identify a masking function comprising a first value for the plurality of values selected on the tau-p envelope, and a second value different from the first value. The data processing system can combine the seismic data in the tau-p domain with the masking function to generate combined seismic data. The data processing system can perform an inverse tau-p transform to the combined seismic data to generate an inverse combined seismic data. The data processing system can apply an adaptive filter to the inverse combined seismic data to correct the plurality of values selected on the tau-p envelope and generate corrected seismic data. The data processing system can subtract coherent events selected from the corrected seismic data to identify one or more locations corresponding to a subsurface lithologic formation of the at least one subsurface lithologic formations.

At least one aspect is directed to a method of performing a seismic survey. The method can include a data processing system receiving seismic data obtained via acoustic signals generated by at least one acoustic source and reflected from at least one subsurface lithologic formation. The method can include the data processing system transforming the seismic data to a tau-p domain, the tau-p domain comprising the seismic data decomposed as a series of lines that map to points in the tau-p. The method can include the data processing system determining a tau-p envelope. The method can include the data processing system normalizing, by the data processing system, the tau-p envelope. The method can include the data processing system identifying a value on the tau-p envelope. The method can include the data processing system selecting a threshold value based on the value identified on the tau-p envelope. The method can include the data processing system selecting a plurality of values on the tau-p envelope greater or equal to the threshold using a flood-fill technique. The method can include the data processing system identifying a masking function comprising a first value for the plurality of values selected on the tau-p envelope, and a second value different from the first value. The method can include the data processing system combining the seismic data in the tau-p domain with the masking function to generate combined seismic data. The method can include the data processing system performing an inverse tau-p transform to the combined seismic data to generate an inverse combined seismic data. The method can include the data processing system applying an adaptive filter to the inverse combined seismic data to correct the plurality of values selected on the tau-p envelope and generate corrected seismic data. The method can include the data processing system subtracting coherent events selected from the corrected seismic data to identify one or more locations corresponding to a subsurface lithologic formation of the at least one subsurface lithologic formations.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

FIGS. 3A-3H are diagrams illustrating an output signal generated by systems and methods of the present disclosure.

Like reference numbers and designations in the various drawings indicate like elements.

DETAILED DESCRIPTION

Figure 1:
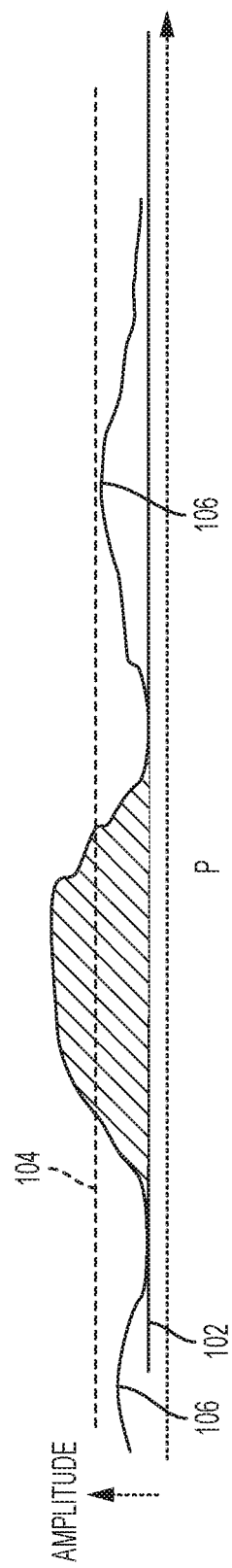
FIG. 1 is a diagram illustrating a thresholding technique performed by the systems and methods of the present disclosure.

The present disclosure is directed to systems and methods that provide a data processing system having a coherency filter component that receives seismic data in a domain and returns the coherent part of the seismic data while removing the incoherent part, such as noise.

For example, the data processing system (e.g., the coherency filter component) can be configured with a technique comprising a greedy-type matching-pursuit linear 3D least-squares time-slowness ("tau-P" or "τ-p") transformation. This technique can include or use a greedy inversion method for a spatially localized, high-resolution Radon transform. The technique can be based on an iterative algorithm, conjugate gradient (CG), that is utilized adaptively in amplitude-prioritized local model spaces. The adaptive inversion can introduce a coherence-oriented mechanism to enhance focusing of significant model parameters, and increase the model resolution and convergence rate. In some cases, the data processing system can apply the technique in a time-space domain local linear Radon transform for data interpolation, where the local Radon transform can include iteratively applying spatially localized forward and adjoint Radon operators to fit the input data. The data processing system can identify optimal local Radon panels via a subspace technique that promotes sparsity in the model, and the missing data can be predicted using the resulting local Radon panels. This sub spacing technique can reduce the resource utilization of computing local Radon coefficients, thereby reducing the total resource utilization for inversion. The data processing system using this technique can handle irregular and regular geometries and significant spatial aliasing.

Thus, the data processing system (e.g., coherency filter component) configured with a τ-p transform and a greedy-type technique can improve the native handling of irregular spaced data, while reducing artifacts due to aliasing. Because of the anti-aliasing properties of the τ-p transform, the data processing system of the present disclosure may or may not use the Normal Moveout Curve ("NMO"). The coherency filter component can perform de-noising, data regularization, data interpolation and multi-source acquisition de-blending of seismic data.

For example, the data processing system can apply the linear τ-p transform in patches so that the detected seismic events are approximately linear. The data domain for ocean bottom node ("OBN") data can be a receiver gather. The data processing system can separate or break-up the receiver gather in 3D sub-volumes of approximately 10×10 traces. The sub-volume of seismic data can refer to a subset (in position or time) of the seismic traces recorded during the gather. The data processing system can then independently coherency filter each sub-volume. The input parameters for the blocking algorithm can include the block sizes in x-y. The input parameter can include one or more padding sizes.

The data processing system can use a transform, such as a 3D least squares (LS) linear τ-p transform. The data processing system can process a matrix that includes a block-circulant-circulant-block (BCCB) structure. The data processing system can exploit this structure to increase the speed of the conjugate gradient solver. For example, the data processing system can use a fast processing technique configured with a computational procedure that is more computationally efficient. The data processing system can use the LS τ-p to improve amplitude fidelity as compared to a simple 3D slant-stack.

Once the data is transformed into the τ-p domain, the data processing system can reduce or eliminate non-coherent and aliasing noise. To this end, the data processing system can determine the envelope of the τ-p data. Because the envelope can include values greater or equal to zero, the data processing system can use the envelope data structure to build the mask that filters all but the coherent events in the τ-p domain. Using the τ-p transform, the data processing system can identify coherent events based on the relatively large amplitude and compact structure and the aliasing noise separated from the main event, as illustrated in FIG. 7. This is in contrast to the F-K domain in which it can be challenging to separate the aliased data component. The linear radon transform can be non-orthogonal, which provides p-values that are coupled. The effect is that the masking-filter of the τ-p domain results in a reduction in the event amplitude after inverse transform even if the LS τ-p transform is used. To alleviate this effect, the data processing system can use an adaptive filter in the t-x domain to adjust the event amplitude after inverse transformation to the event amplitude at input.

The matching-pursuit τ-p coherency filter technique can include the following acts. At ACT 1, the data processing system can apply a forward τ-p transform. At ACT 2, the data processing system can determine or calculate the τ-p envelope. At ACT 3, the data processing system can normalize the envelope data. At ACT 4, the data processing system can identify or find the τ-px-py position of the (next) largest envelope value. At ACT 5, the data processing system can select a threshold value. At ACT 6, the data processing system can select some or all τ-p envelope values that are larger than, or equal to, the threshold value using a flood-fill algorithm. At ACT 7, the data processing system can create or update a masking function, which can be one for the selected τ-p locations and zero elsewhere. At ACT 8, the data processing system can multiply τ-p transformed data with the masking function. At ACT 9, the data processing system can perform an inverse τ-p transform. At ACT 10, the data processing system can apply an adaptive filter to correct the selected event amplitudes. At ACT 11, the data processing system can subtract the selected coherent events from the input data and loop back to ACT 1.

The data processing system can stop the iteration when some or all coherent events have been selected. In order to reduce the number of transforms that are performed, the data processing system can perform ACTS 4-7 within an inner processing loop. The data processing system can further facilitate efficient processing by applying an automatic gain control ("AGC") type scaling to the τ-p envelope to boost later low amplitude events. The data processing system can select a the AGC time window to prevent or avoid boosting aliased noise such that the data processing system mistakenly identifies the aliased noise for a coherent event. The aliasing noise scales with the event amplitude, therefore subtraction of a coherent event eliminates the corresponding aliasing noise, allowing selection of lower amplitude events in the next iteration.

The data processing system can use a floodfill technique to select a region in the τ-p domain. Using a floodfill technique to select the region can be different from thresholding. For example, FIG. 1 illustrates using a floodfill technique as compared to thresholding. As shown in FIG. 1, thresholding using floodfill allows use of the green threshold value 102, while the regular threshold value has to be above the noise lobes 106, illustrated by line 104.

The data processing system can use the floodfill technique to automatically select a threshold value. For example, a threshold which is too low can result in a very large number of selected points, while a collapse to a compact region is readily recognized as illustrated in FIGS. 3A-3H and FIGS. 7A-7C. The data processing system can start with a low threshold amplitude, and then repeat the floodfill technique with subsequently higher values until the number of selected values fall below a predefined value.

Figure 2:
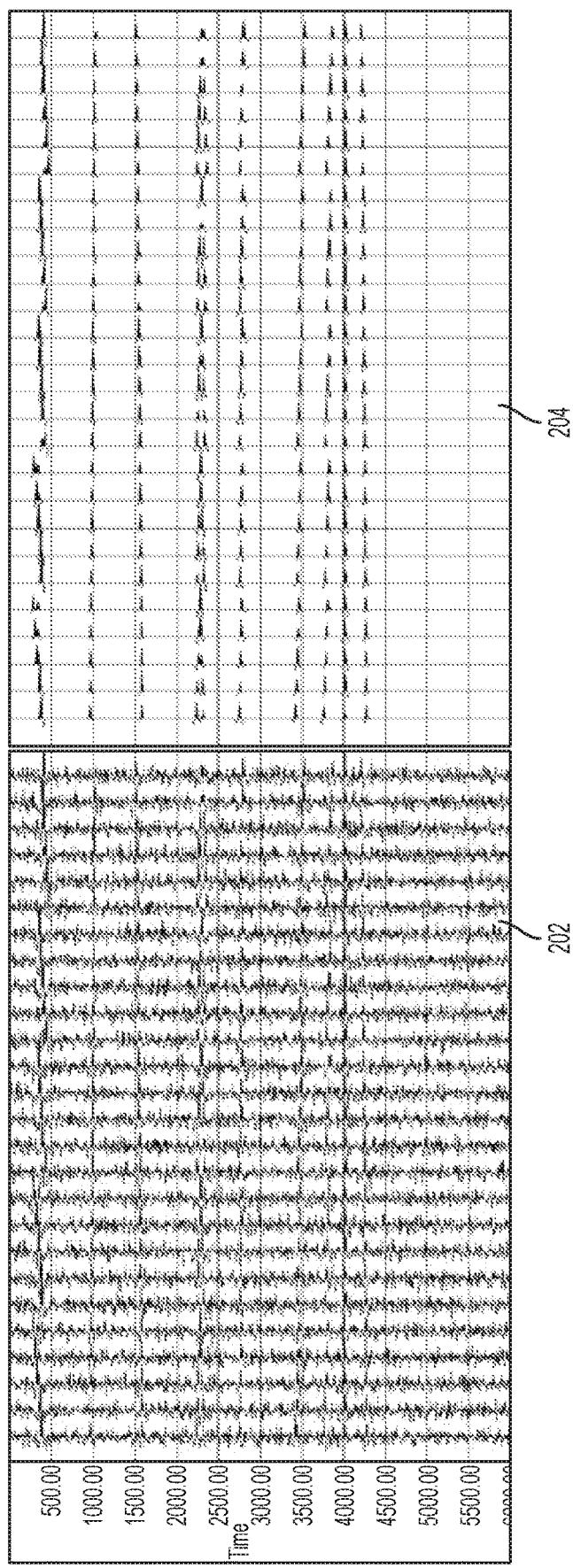
FIG. 2 is a diagram illustrating an output signal generated by systems and methods of the present disclosure.
Figure 3A:
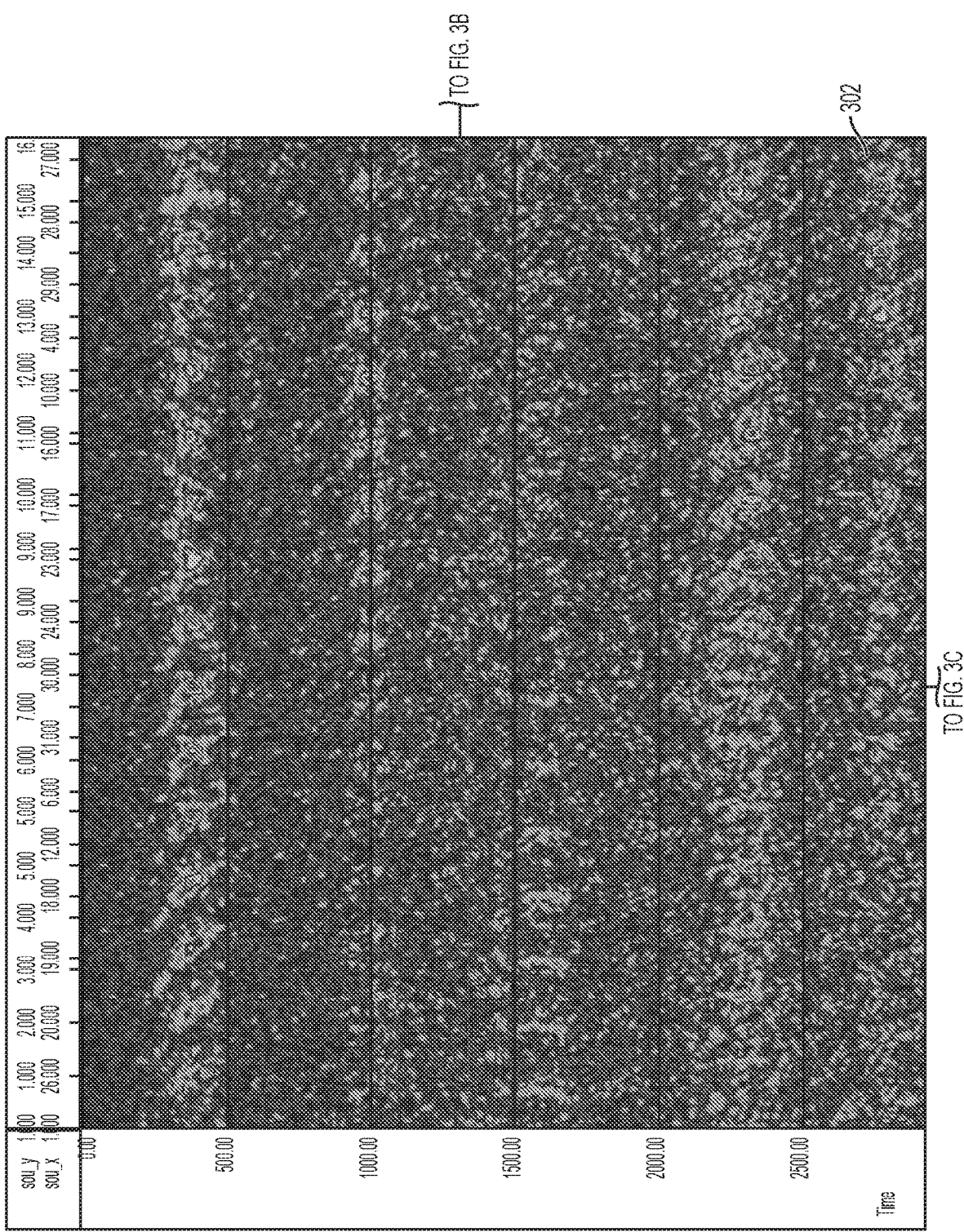
Figure 3C:
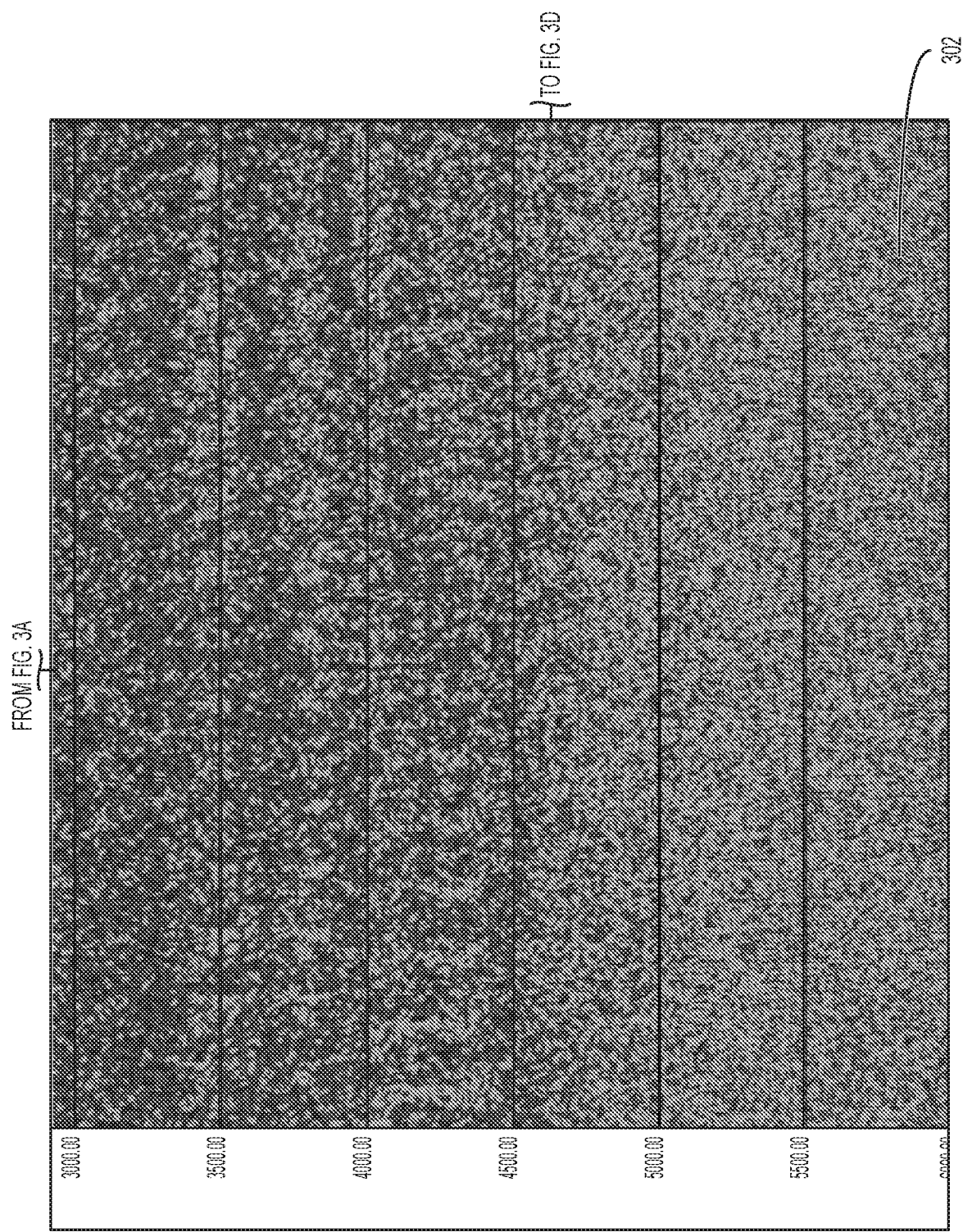
Figure 3D:
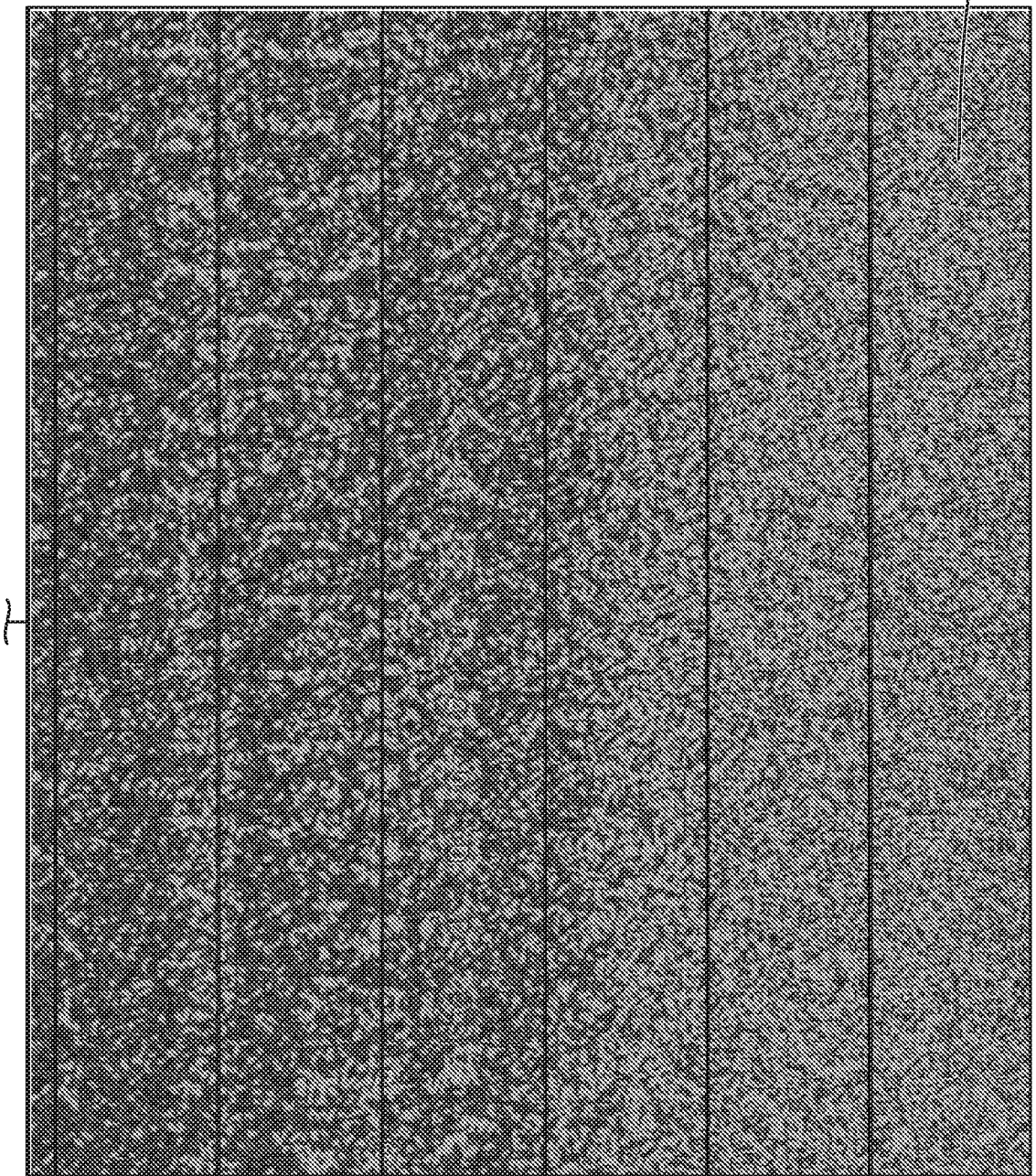
Figure 3G:
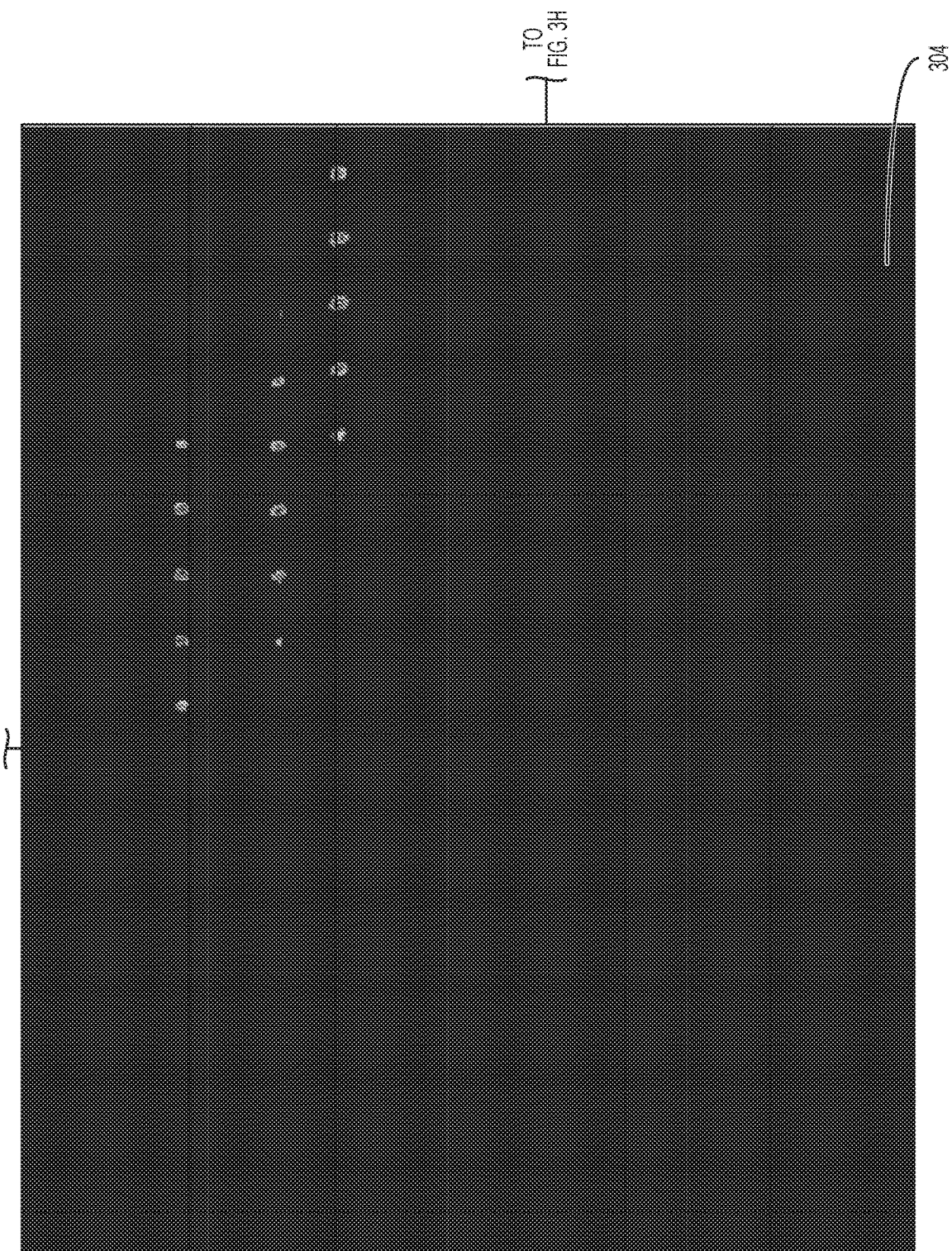
Figure 3H:
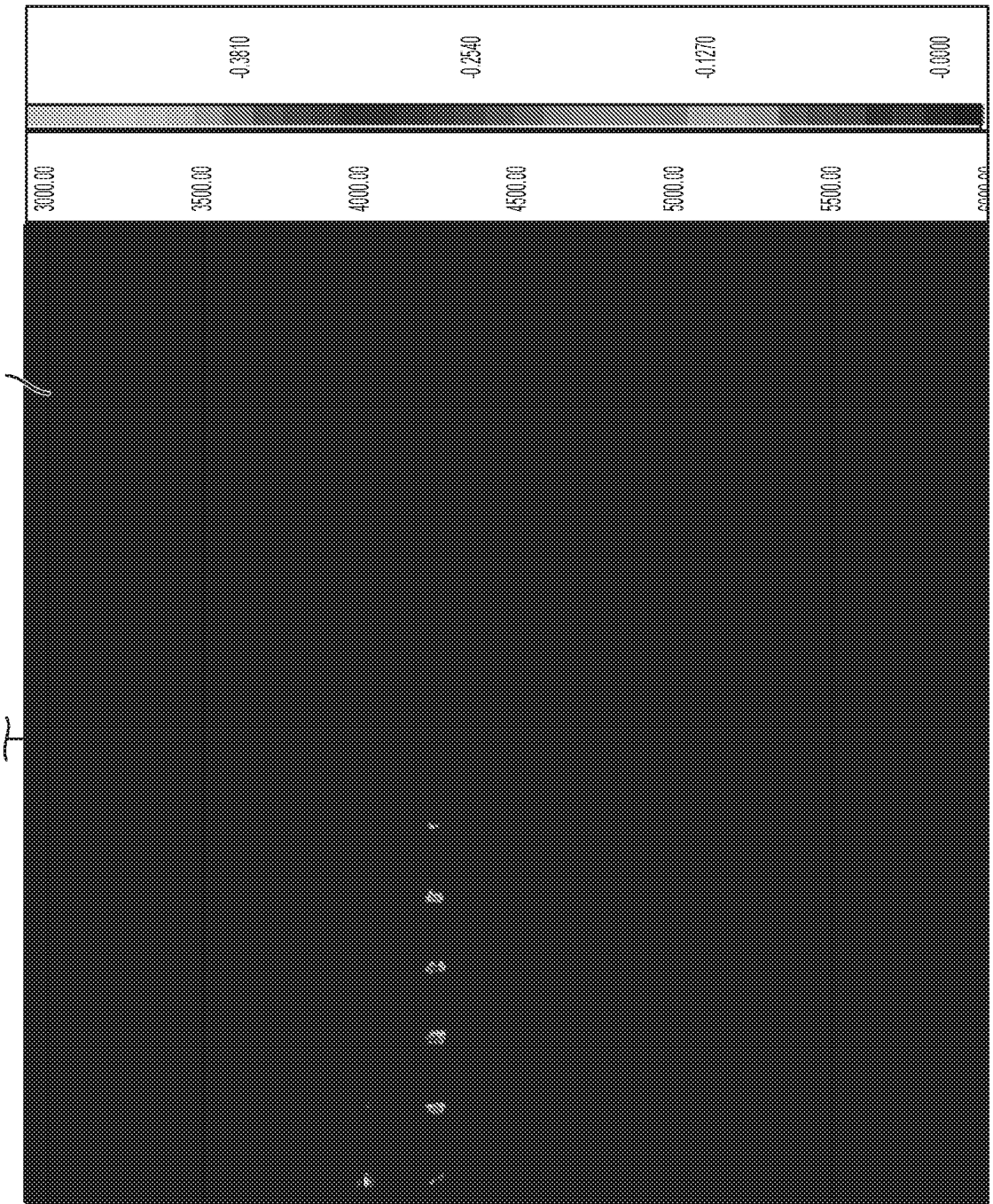

FIGS. 1-3H illustrate the data processing system applying one or more techniques to attenuate random noise. The data processing system can use a synthetic data set with a high level of random noise, as illustrated in FIG. 2. FIG. 2 shows one 3D block of the data. FIG. 2 illustrates a noisy input signal 202, which is a first part of the 3D block of the data, and a coherency filter output signal 204.

FIGS. 3A-3H illustrates the τ-p envelope for one block before and after auto-editing of the τ-p domain. As illustrated in FIGS. 3A-3D, the diagram 302 is a corresponding 3D τ-p envelope of the noisy input data (illustrated in 202) after 2500 AGC. The diagram 304 illustrated in FIGS. 3E-3H illustrates the result after the data processing system applies a τ-p envelope with auto-editing. As shown in FIGS. 3E-3H, the noise level is attenuated and the coherent events are apparent.

Figure 4:
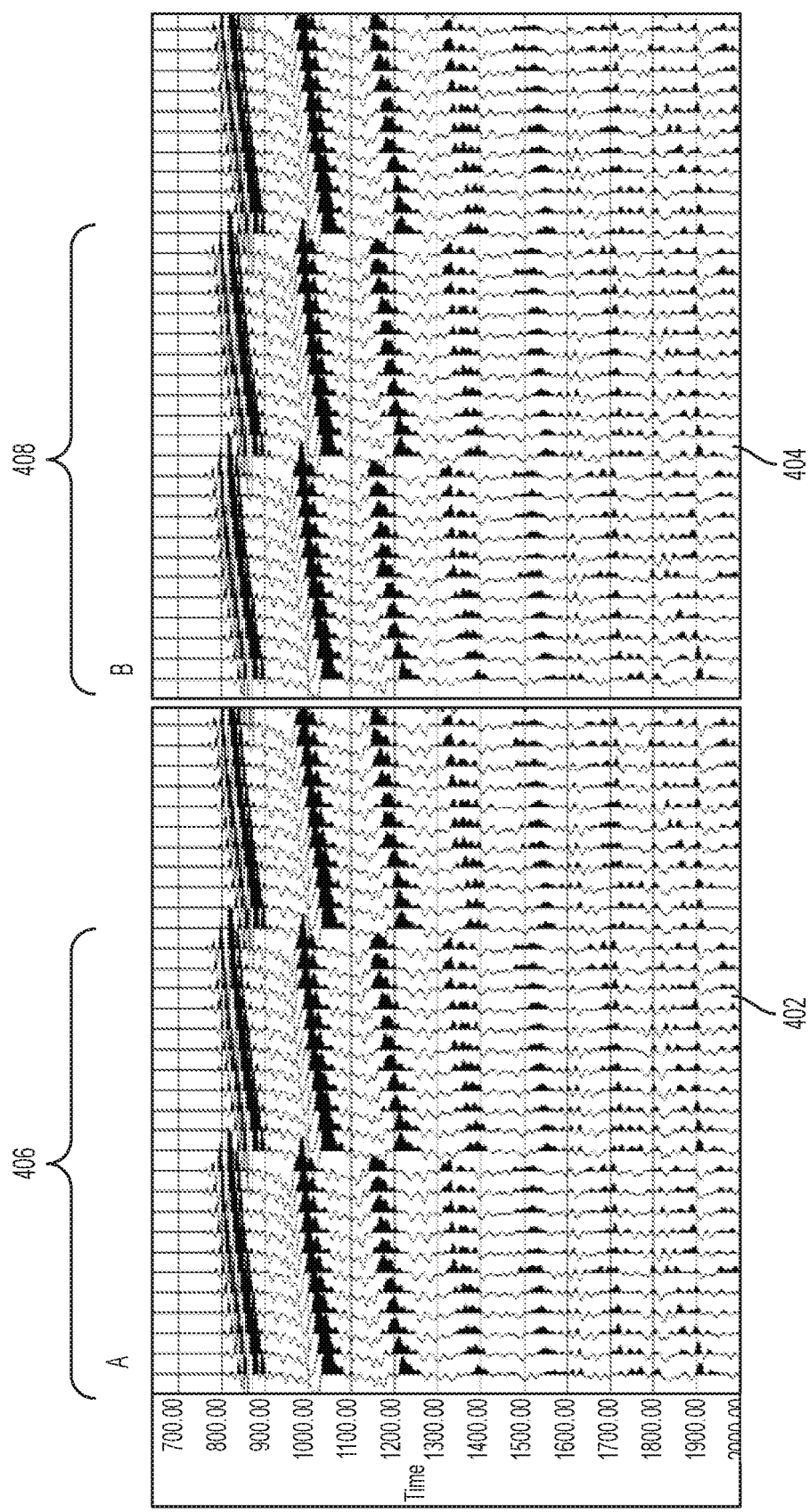
FIG. 4 is a diagram illustrating outputs signals generated by systems and methods of the present disclosure.
Figure 5:
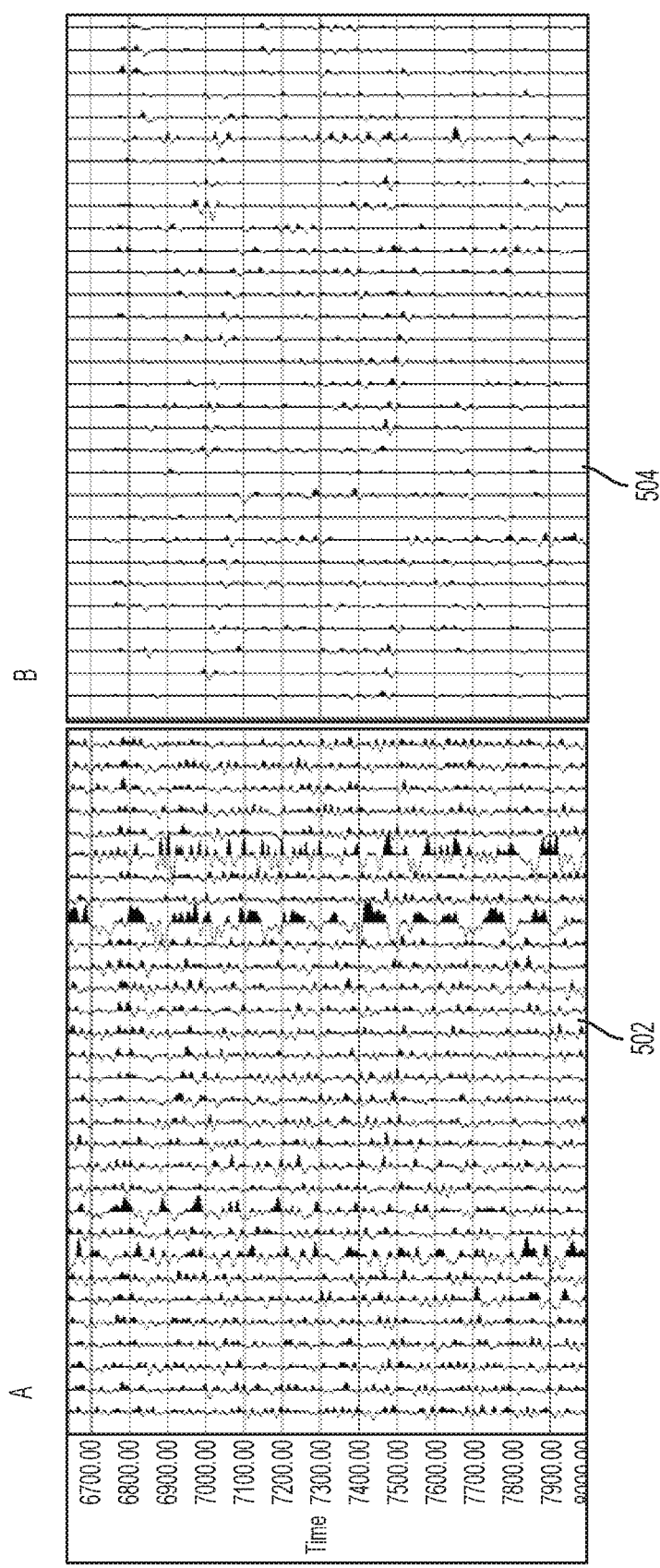
FIG. 5 is a diagram illustrating outputs signals generated by systems and methods of the present disclosure.

FIGS. 4-5 illustrate the data processing system applying a coherency filter. The data processing system can use real data from an OBN survey. FIG. 4 illustrates a portion of a block with real data showing amplitude and phase fidelity of the coherency filter in the presence of large amplitude differences between events. Block 402 is the input signal, and block 404 can be the output signal. The first two panels 406 and 408 in FIG. 4 show data around the first break before the coherency filter (402) and after the coherency filter (404). The input signal 402 can be input to the coherency filter component of the data processing system, and the data processing system can generate the output signal 404. Since the data is highly coherent, the data processing system can reproduce the input data. The challenge here is to deal with the large amplitude difference between the first arrival and some small following events.

FIG. 5 illustrates similar data as in FIG. 4, but for later times. The seismic reflections and signal to noise ratio can be much smaller, so the data processing system may recognize fewer coherent events as compared to the earlier times illustrated in FIG. 4. FIG. 5 illustrates a visible difference between input signals 502 and output signals 504 because of the coherency filter component used to generate the output signal 504. For example, the input signals 502 can be input to the data processing system, and the data processing system can generate output signal 504.

Figure 6:
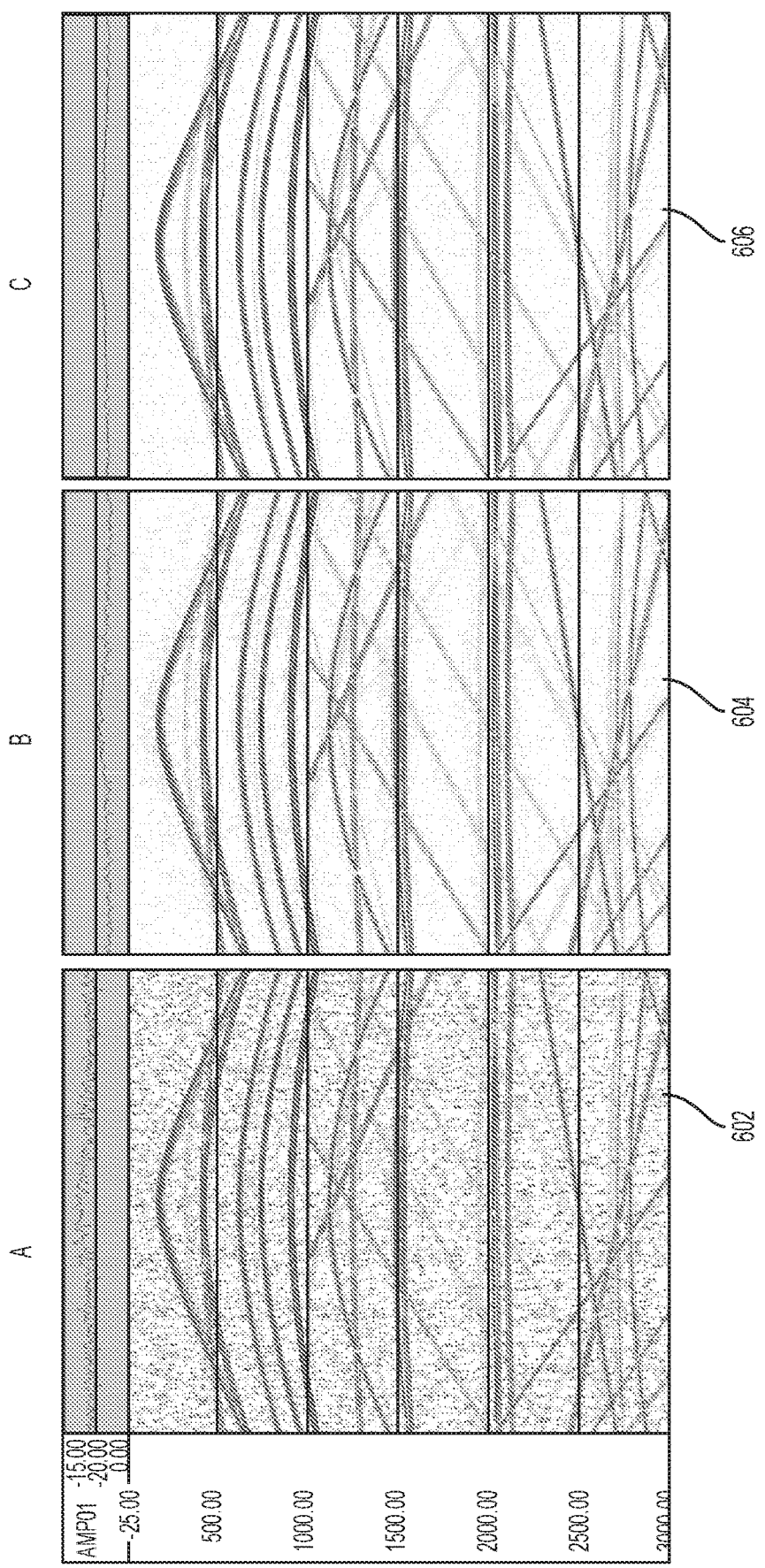
FIG. 6 is a diagram illustrating outputs signals generated by systems and methods of the present disclosure.
Figure 7A:
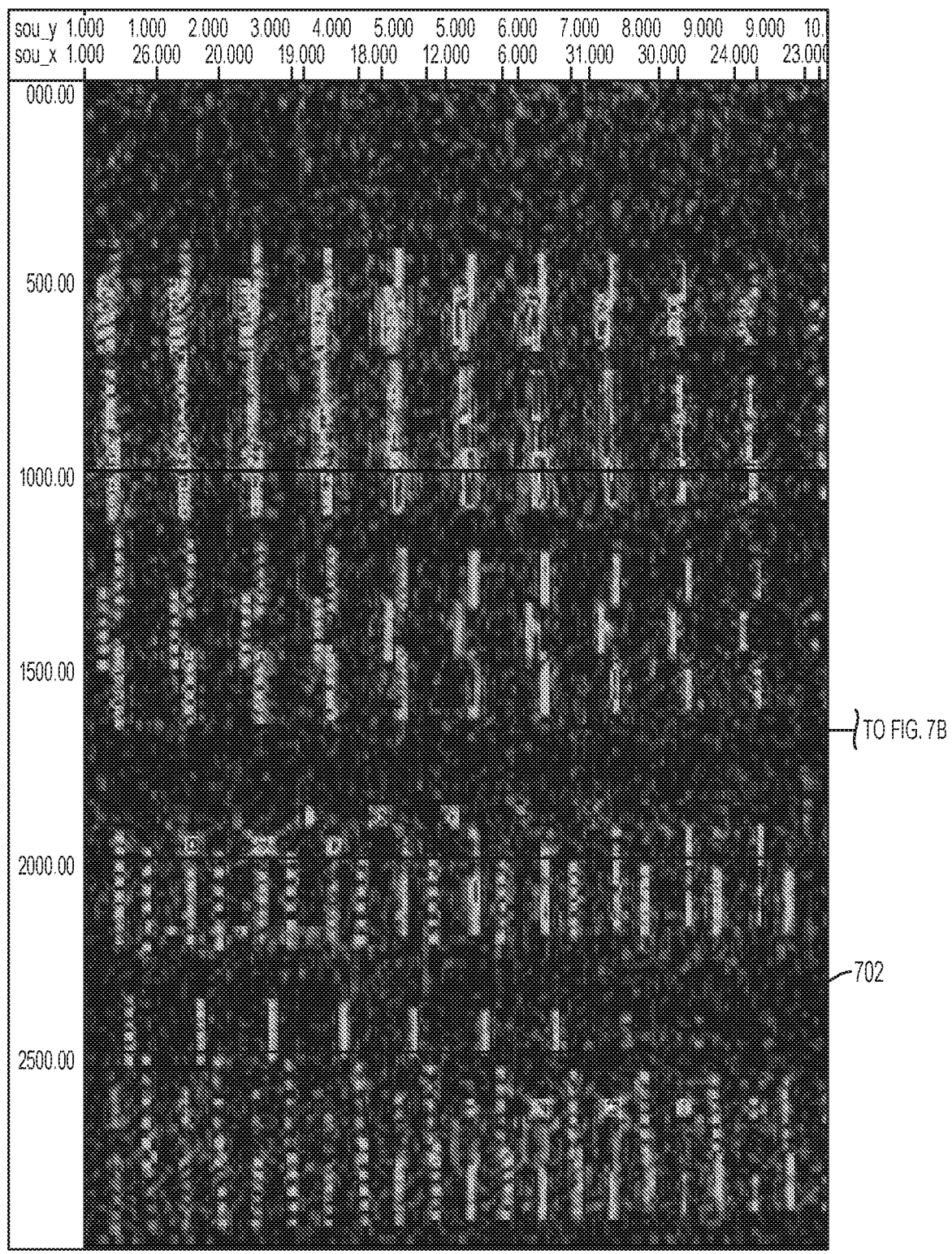
FIGS. 7A-7C are diagrams illustrating output signals generated by systems and methods of the present disclosure.
Figure 7B:
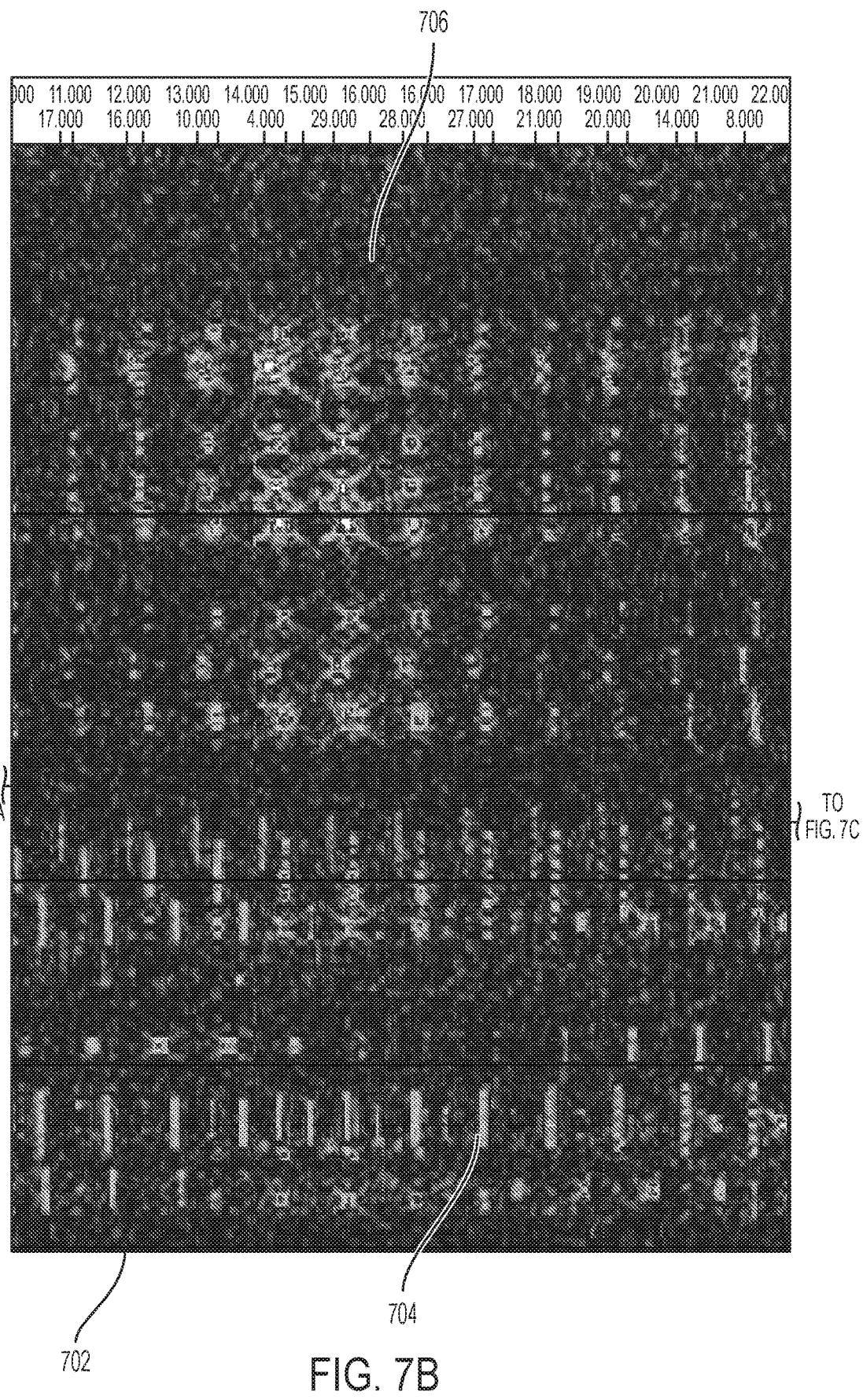
Figure 7C:
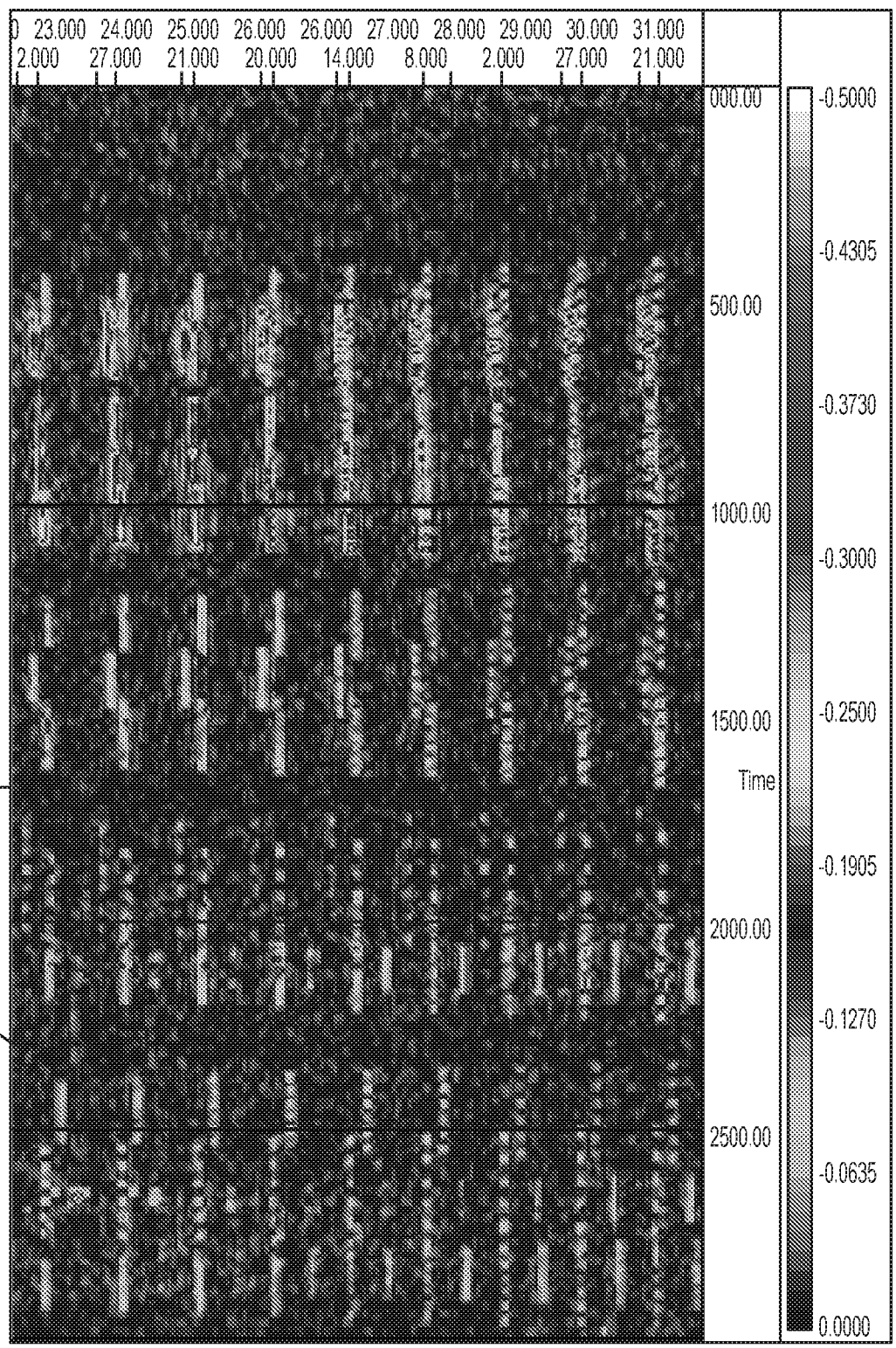

FIGS. 6-7C illustrate the data processing system performing deblending. The data processing system can perform deblending in the common receiver domain. In the common receiver domain, the blending noise can be non-coherent.

FIG. 6 illustrates one gun line with 4-sources blended (602); de-blended (604); and unblended (606) data. The data processing system can use one or more deblending techniques, such as direct elimination of the spikes, or estimation of the coherent events. Direct elimination of the spikes can include, for example, median filtering or space-varying median filtering that removes blending noise using signal reliability (e.g., local similarity between the data initially filtered using the median filter and the original noisy data) as a reference to pick up the blending spikes and increase the window length in order to attenuate the spikes. The data processing system can decrease the window length to preserve more energy.

The data processing system can use an iteration loop in order to access lower amplitude events. For example, the iteration loop can include techniques that filter out the blending noise by arranging seismic data in some domain, and inversion techniques. The iteration loop can include an iterative estimation and subtraction technique that integrates filtering and inversion techniques. The data processing system can perform the iteration loop by re-blending the estimated coherent data and subtracting the coherent data and the corresponding blending noise from the input before starting the next iteration.

As illustrated in FIG. 6, the data processing system can use synthetic test data including, for example, 50 hyperbolic and 50 linear kinematic events with random moveout and amplitude. The data processing system can simulate a four source simultaneous shooting configuration. The cross-line separation of the four sources can be 50 meters, for example. This configuration can use one source boat in the field. FIG. 6 illustrates a portion of the blended data (602), de-blended data after 5 iterations of the iteration loop (604), and the unblended data (606) for comparison. FIG. 6 also illustrates the root mean squared ("RMS") trace amplitude values. FIG. 6 shows the τ-p envelope of one block of the blended data.

FIGS. 7A-7C illustrate a normalized τ-px-py envelope for one block of the 4-source blended data. As illustrated in FIG. 7A-7C, the data processing system can generate an improved diagram 702 with an output signal 704 that distinguishes from aliasing and blending noise 706.

Thus, the data processing system can automatically edit data in the τ-p domain to reduce or eliminate aliasing and non-coherent data to facilitate identifying the output signal or seismic events.

Figure 8:
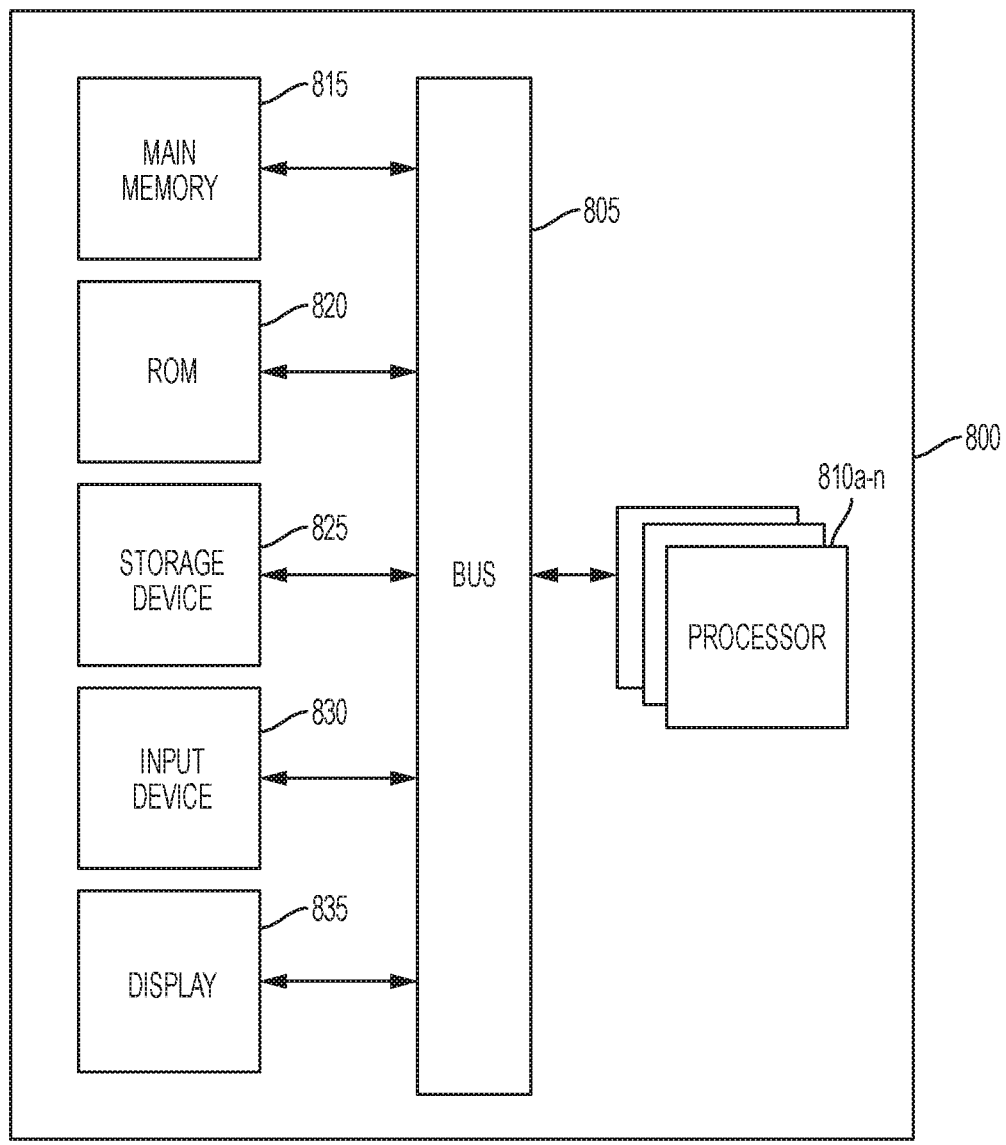
FIG. 8 depicts a block diagram of an architecture for a computing system employed to implement various elements of the data processing system to perform the functions depicted in FIGS. 1-7 and 9-11.

FIG. 8 depicts a block diagram of an architecture for a computing system employed to implement various elements of the data processing system to perform one or more functions depicted in FIGS. 1-7C and 9-11. FIG. 8 is a block diagram of a data processing system including a computer system 800 in accordance with an embodiment. The computer system can include or execute a coherency filter component. The data processing system, computer system or computing device 800 can be used to implement one or more component configured to filter, translate, transform, generate, analyze, or otherwise process the data or signals depicted in FIGS. 1-7C. The computing system 800 includes a bus 805 or other communication component for communicating information and a processor 810*a-n* or processing circuit coupled to the bus 805 for processing information. The computing system 800 can also include one or more processors 810 or processing circuits coupled to the bus for processing information. The computing system 800 also includes main memory 815, such as a random access memory (RAM) or other dynamic storage device, coupled to the bus 805 for storing information, and instructions to be executed by the processor 810. Main memory 815 can also be used for storing seismic data, binning function data, images, reports, tuning parameters, executable code, temporary variables, or other intermediate information during execution of instructions by the processor 810. The computing system 800 may further include a read only memory (ROM) 820 or other static storage device coupled to the bus 805 for storing static information and instructions for the processor 810. A storage device 825, such as a solid state device, magnetic disk or optical disk, is coupled to the bus 805 for persistently storing information and instructions.

The computing system 800 may be coupled via the bus 805 to a display 835 or display device, such as a liquid crystal display, or active matrix display, for displaying information to a user. An input device 830, such as a keyboard including alphanumeric and other keys, may be coupled to the bus 805 for communicating information and command selections to the processor 810. The input device 830 can include a touch screen display 835. The input device 830 can also include a cursor control, such as a mouse, a trackball, or cursor direction keys, for communicating direction information and command selections to the processor 810 and for controlling cursor movement on the display 835.

The processes, systems and methods described herein can be implemented by the computing system 800 in response to the processor 810 executing an arrangement of instructions contained in main memory 815. Such instructions can be read into main memory 815 from another computer-readable medium, such as the storage device 825. Execution of the arrangement of instructions contained in main memory 815 causes the computing system 800 to perform the illustrative processes described herein. One or more processors in a multi-processing arrangement may also be employed to execute the instructions contained in main memory 815. In some embodiments, hard-wired circuitry may be used in place of or in combination with software instructions to effect illustrative implementations. Thus, embodiments are not limited to any specific combination of hardware circuitry and software.

Although an example computing system has been described in FIG. 8, embodiments of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources. The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, subprograms, or portions of code). A computer program can be deployed to be executed on one computer or on multiple computers that are located at one site or distributed across multiple sites and interconnected by a communication network.

Processors suitable for the execution of a computer program include, by way of example, microprocessors, and any one or more processors of a digital computer. A processor can receive instructions and data from a read only memory or a random access memory or both. The elements of a computer are a processor for performing actions in accordance with instructions and one or more memory devices for storing instructions and data. A computer can include, or be operatively coupled to receive data from or transfer data to, or both, one or more mass storage devices for storing data, e.g., magnetic, magneto optical disks, or optical disks. A computer need not have such devices. Moreover, a computer can be embedded in another device, e.g., a personal digital assistant (PDA), a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The implementations described herein can be implemented in any of numerous ways including, for example, using hardware, software or a combination thereof. When implemented in software, the software code can be executed on any suitable processor or collection of processors, whether provided in a single computer or distributed among multiple computers.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

A computer employed to implement at least a portion of the functionality described herein may comprise a memory, one or more processing units (also referred to herein simply as "processors"), one or more communication interfaces, one or more display units, and one or more user input devices. The memory may comprise any computer-readable media, and may store computer instructions (also referred to herein as "processor-executable instructions") for implementing the various functionalities described herein. The processing unit(s) may be used to execute the instructions. The communication interface(s) may be coupled to a wired or wireless network, bus, or other communication means and may therefore allow the computer to transmit communications to or receive communications from other devices. The display unit(s) may be provided, for example, to allow a user to view various information in connection with execution of the instructions. The user input device(s) may be provided, for example, to allow the user to make manual adjustments, make selections, enter data or various other information, or interact in any of a variety of manners with the processor during execution of the instructions.

The various methods or processes outlined herein may be coded as software that is executable on one or more processors that employ any one of a variety of operating systems or platforms. Additionally, such software may be written using any of a number of suitable programming languages or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the solution discussed above. The computer readable medium or media can be transportable, such that the program or programs stored thereon can be loaded onto one or more different computers or other processors to implement various aspects of the present solution as discussed above.

The terms "program" or "software" are used herein to refer to any type of computer code or set of computer-executable instructions that can be employed to program a computer or other processor to implement various aspects of embodiments as discussed above. One or more computer programs that when executed perform methods of the present solution need not reside on a single computer or processor, but may be distributed in a modular fashion amongst a number of different computers or processors to implement various aspects of the present solution.

Computer-executable instructions may be in many forms, such as program modules, executed by one or more computers or other devices. Program modules can include routines, programs, objects, components, data structures, or other components that perform particular tasks or implement particular abstract data types. The functionality of the program modules can be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Figure 9:
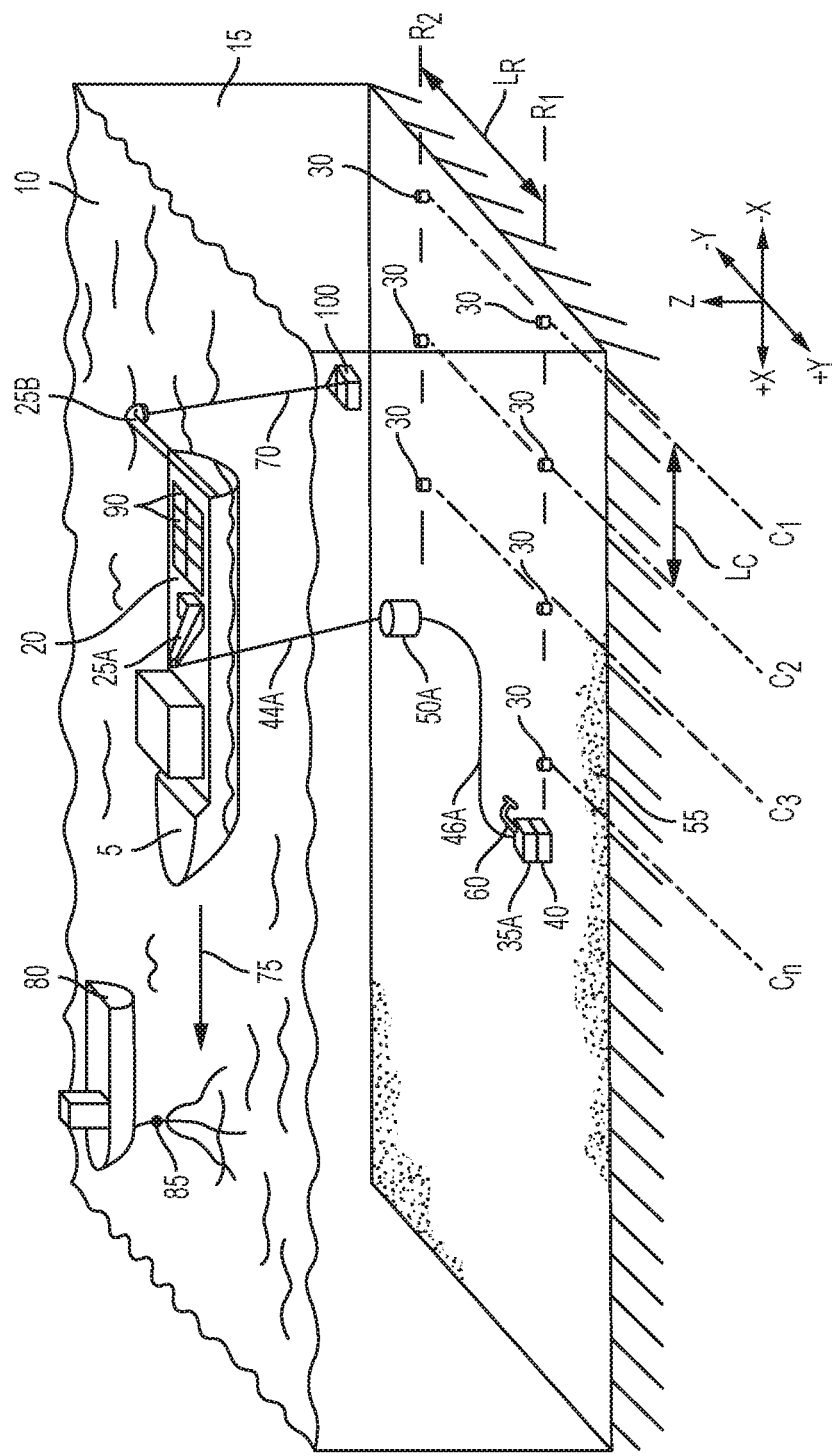
FIG. 9 depicts an isometric schematic view of an example of a seismic operation in deep water.

FIG. 9 is an isometric schematic view of an example of a seismic operation in deep water facilitated by a first marine vessel 5. FIG. 9 is a non-limiting illustrative example of a marine environment in which the systems and methods of the present disclosure can perform a seismic survey or calibrate a geophone and hydrophone pair.

By way of example, FIG. 9 illustrates a first vessel 5 positioned on a surface 10 of a water column 15 and includes a deck 20 which supports operational equipment. At least a portion of the deck 20 includes space for a plurality of sensor device racks 90 where seismic sensor devices (e.g., first device 102) are stored. The sensor device racks 90 may also include data retrieval devices or sensor recharging devices.

The deck 20 also includes one or more cranes 25A, 25B attached thereto to facilitate transfer of at least a portion of the operational equipment, such as an ROV (e.g., second device 104) or seismic sensor devices, from the deck 20 to the water column 15. For example, a crane 25A coupled to the deck 20 is configured to lower and raise an ROV 35A, which transfers and positions one or more sensor devices 30 on a seabed 55. The seabed 55 can include a lakebed 55, ocean floor 55, or earth 55. The ROV 35A is coupled to the first vessel 5 by a tether 46A and an umbilical cable 44A that provides power, communications, and control to the ROV 35A. A tether management system (TMS) 50A is also coupled between the umbilical cable 44A and the tether 46A. The TMS 50A may be utilized as an intermediary, subsurface platform from which to operate the ROV 35A. For most ROV 35A operations at or near the seabed 55, the TMS 50A can be positioned approximately 50 feet above seabed 55 and can pay out tether 46A as needed for ROV 35A to move freely above seabed 55 in order to position and transfer seismic sensor devices 30 thereon.

A crane 25B may be coupled (e.g., via a latch, anchor, nuts and bolts, screw, suction cup, magnet, or other fastener) to a stern of the first vessel 5, or other locations on the first vessel 5. Each of the cranes 25A, 25B may be any lifting device or launch and recovery system (LARS) adapted to operate in a marine environment. The crane 25B can be coupled to a seismic sensor transfer device 100 by a cable 70. The transfer device 100 may be a drone, a skid structure, a basket, or any device capable of housing one or more sensor devices 30 therein. The transfer device 100 may be a structure configured as a magazine adapted to house and transport one or more sensor devices 30. The transfer device 100 may include an on-board power supply, a motor or gearbox, or a propulsion system 105. The transfer device 100 can be configured as a sensor device storage rack for transfer of sensor devices 30 from the first vessel 5 to the ROV 35A, and from the ROV 35A to the first vessel 5. The transfer device 100 may include an on-board power supply, a motor or gearbox, or a propulsion system 105. Alternatively, the transfer device 100 may not include any integral power devices or not require any external or internal power source. The cable 70 can provide power or control to the transfer device 100. Alternatively, the cable 70 may be an umbilical, a tether, a cord, a wire, a rope, and the like, that is configured solely for support of the transfer device 100.

The ROV 35A can include a seismic sensor device storage compartment 40 that is configured to store one or more seismic sensor devices 30 (e.g., first devices 102) therein for a deployment or retrieval operation. The storage compartment 40 may include a magazine, a rack, or a container configured to store the seismic sensor devices. The storage compartment 40 may also include a conveyor, such as a movable platform having the seismic sensor devices thereon, such as a carousel or linear platform configured to support and move the seismic sensor devices 30 therein. The seismic sensor devices 30 can be deployed on the seabed 55 and retrieved therefrom by operation of the movable platform. The ROV 35A may be positioned at a predetermined location above or on the seabed 55 and seismic sensor devices 30 are rolled, conveyed, or otherwise moved out of the storage compartment 40 at the predetermined location. The seismic sensor devices 30 can be deployed and retrieved from the storage compartment 40 by a robotic device 60, such as a robotic arm, an end effector or a manipulator, disposed on the ROV 35A.

The seismic sensor device 30 may be referred to as seismic data acquisition unit 30 or node 30 or first device 102. The seismic data acquisition unit 30 can record seismic data. The seismic data acquisition unit 30 may include one or more of at least one geophone, at least one hydrophone, at least one power source (e.g., a battery, external solar panel), at least one clock, at least one tilt meter, at least one environmental sensor, at least one seismic data recorder, at least global positioning system sensor, at least one wireless or wired transmitter, at least one wireless or wired receiver, at least one wireless or wired transceiver, or at least one processor. The seismic sensor device 30 may be a self-contained unit such that all electronic connections are within the unit, or one or more components can be external to the seismic sensor device 30. During recording, the seismic sensor device 30 may operate in a self-contained manner such that the node does not require external communication or control. The seismic sensor device 30 may include several geophones and hydrophones configured to detect acoustic waves that are reflected by subsurface lithological formation or hydrocarbon deposits. The seismic sensor device 30 may further include one or more geophones that are configured to vibrate the seismic sensor device 30 or a portion of the seismic sensor device 30 in order to detect a degree of coupling between a surface of the seismic sensor device 30 and a ground surface. One or more component of the seismic sensor device 30 may attach to a gimbaled platform having multiple degrees of freedom. For example, the clock may be attached to the gimbaled platform to minimize the effects of gravity on the clock.

For example, in a deployment operation, a first plurality of seismic sensor devices, comprising one or more sensor devices 30, may be loaded into the storage compartment 40 while on the first vessel 5 in a pre-loading operation. The ROV 35A, having the storage compartment coupled thereto, is then lowered to a subsurface position in the water column 15. The ROV 35A utilizes commands from personnel on the first vessel 5 to operate along a course to transfer the first plurality of seismic sensor devices 30 from the storage compartment 40 and deploy the individual sensor devices 30 at selected locations on the seabed 55. Once the storage compartment 40 is depleted of the first plurality of seismic sensor devices 30, the transfer device 100 is used to ferry a second plurality of seismic sensor devices 30 as a payload from first vessel 5 to the ROV 35A.

The transfer system 100 may be preloaded with a second plurality of seismic sensor devices 30 while on or adjacent the first vessel 5. When a suitable number of seismic sensor devices 30 are loaded onto the transfer device 100, the transfer device 100 may be lowered by crane 25B to a selected depth in the water column 15. The ROV 35A and transfer device 100 are mated at a subsurface location to allow transfer of the second plurality of seismic sensor devices 30 from the transfer device 100 to the storage compartment 40. When the transfer device 100 and ROV 35A are mated, the second plurality of seismic sensor devices 30 contained in the transfer device 100 are transferred to the storage compartment 40 of the ROV 35A. Once the storage compartment 40 is reloaded, the ROV 35A and transfer device 100 are detached or unmated and seismic sensor device placement by ROV 35A may resume. Reloading of the storage compartment 40 can be provided while the first vessel 5 is in motion. If the transfer device 100 is empty after transfer of the second plurality of seismic sensor devices 30, the transfer device 100 may be raised by the crane 25B to the vessel 5 where a reloading operation replenishes the transfer device 100 with a third plurality of seismic sensor devices 30. The transfer device 100 may then be lowered to a selected depth when the storage compartment 40 is reloaded. This process may repeat as until a desired number of seismic sensor devices 30 have been deployed.

Using the transfer device 100 to reload the ROV 35A at a subsurface location reduces the time required to place the seismic sensor devices 30 on the seabed 55, or "planting" time, as the ROV 35A is not raised and lowered to the surface 10 for seismic sensor device reloading. The ROV 35A can synchronize a clock of the node 30 at the time of planting. Further, mechanical stresses placed on equipment utilized to lift and lower the ROV 35A are minimized as the ROV 35A may be operated below the surface 10 for longer periods. The reduced lifting and lowering of the ROV 35A may be particularly advantageous in foul weather or rough sea conditions. Thus, the lifetime of equipment may be enhanced as the ROV 35A and related equipment are not raised above surface 10, which may cause the ROV 35A and related equipment to be damaged, or pose a risk of injury to the vessel personnel.

Likewise, in a retrieval operation, the ROV 35A can utilize commands from personnel on the first vessel 5 to retrieve each seismic sensor device 30 that was previously placed on seabed 55, or collect data from the seismic sensor device 30 without retrieving the device 30. The ROV 35A can adjust the clock of the device 30 while collecting the seismic data. The retrieved seismic sensor devices 30 are placed into the storage compartment 40 of the ROV 35A. In some implementations, the ROV 35A may be sequentially positioned adjacent each seismic sensor device 30 on the seabed 55 and the seismic sensor devices 30 are rolled, conveyed, or otherwise moved from the seabed 55 to the storage compartment 40. The seismic sensor devices 30 can be retrieved from the seabed 55 by a robotic device 60 disposed on the ROV 35A.

Once the storage compartment 40 is full or contains a pre-determined number of seismic sensor devices 30, the transfer device 100 is lowered to a position below the surface 10 and mated with the ROV 35A. The transfer device 100 may be lowered by crane 25B to a selected depth in the water column 15, and the ROV 35A and transfer device 100 are mated at a subsurface location. Once mated, the retrieved seismic sensor devices 30 contained in the storage compartment 40 are transferred to the transfer device 100. Once the storage compartment 40 is depleted of retrieved sensor devices, the ROV 35A and transfer device 100 are detached and sensor device retrieval by ROV 35A may resume. Thus, the transfer device 100 is used to ferry the retrieved seismic sensor devices 30 as a payload to the first vessel 5, allowing the ROV 35A to continue collection of the seismic sensor devices 30 from the seabed 55. In this manner, sensor device retrieval time is significantly reduced as the ROV 35A is not raised and lowered for sensor device unloading. Further, safety issues and mechanical stresses placed on equipment related to the ROV 35A are minimized as the ROV 35A may be subsurface for longer periods.

For example, the first vessel 5 can travel in a first direction 75, such as in the +X direction, which may be a compass heading or other linear or predetermined direction. The first direction 75 may also account for or include drift caused by wave action, current(s) or wind speed and direction. The plurality of seismic sensor devices 30 can be placed on the seabed 55 in selected locations, such as a plurality of rows Rn in the X direction (R1 and R2 are shown) or columns Cn in the Y direction (C1-Cn are shown), wherein n equals an integer. The rows Rn and columns Cn can define a grid or array, wherein each row Rn (e.g., R1-R2) comprises a receiver line in the width of a sensor array (X direction) or each column Cn comprises a receiver line in a length of the sensor array (Y direction). The distance between adjacent sensor devices 30 in the rows is shown as distance LR and the distance between adjacent sensor devices 30 in the columns is shown as distance LC. While a substantially square pattern is shown, other patterns may be formed on the seabed 55. Other patterns include non-linear receiver lines or non-square patterns. The pattern(s) may be pre-determined or result from other factors, such as topography of the seabed 55. The distances LR and LC can be substantially equal and may include dimensions between about 60 meters to about 400 meters, or greater. The distance between adjacent seismic sensor devices 30 may be predetermined or result from topography of the seabed 55 as described above.

The first vessel 5 is operated at a speed, such as an allowable or safe speed for operation of the first vessel 5 and any equipment being towed by the first vessel 5. The speed may take into account any weather conditions, such as wind speed and wave action, as well as currents in the water column 15. The speed of the vessel may also be determined by any operations equipment that is suspended by, attached to, or otherwise being towed by the first vessel 5. For example, the speed can be limited by the drag coefficients of components of the ROV 35A, such as the TMS 50A and umbilical cable 44A, as well as any weather conditions or currents in the water column 15. As the components of the ROV 35A are subject to drag that is dependent on the depth of the components in the water column 15, the first vessel speed may operate in a range of less than about 1 knot. In examples where two receiver lines (rows R1 and R2) are being laid, the first vessel includes a first speed of between about 0.2 knots and about 0.6 knots. In some implementations, the first speed includes an average speed of between about 0.25 knots, which includes intermittent speeds of less than 0.25 knots and speeds greater than about 1 knot, depending on weather conditions, such as wave action, wind speeds, or currents in the water column 15.

During a seismic survey, one receiver line, such as row R1 may be deployed. When the single receiver line is completed a second vessel 80 can be used to provide a source signal. In some cases, the first vessel or other device can provide the source signal. The second vessel 80 is provided with a source device or acoustic source device 85, which may be a device capable of producing acoustical signals or vibrational signals suitable for obtaining the survey data. The source signal propagates to the seabed 55 and a portion of the signal is reflected back to the seismic sensor devices 30. The second vessel 80 may be required to make multiple passes, for example at least four passes, per a single receiver line (row R1 in this example). During the time the second vessel 80 is making the passes, the first vessel 5 continues deployment of a second receiver line. However, the time involved in making the passes by the second vessel 80 is much shorter than the deployment time of the second receiver line. This causes a lag time in the seismic survey as the second vessel 80 sits idle while the first vessel 5 is completing the second receiver line.

The first vessel 5 can use one ROV 35A to lay sensor devices to form a first set of two receiver lines (rows R1 and R2) in any number of columns, which may produce a length of each receiver line of up to and including several miles. The two receiver lines (rows R1 and R2) can be substantially (e.g., within +/−10 degrees) parallel. When a single directional pass of the first vessel 5 is completed and the first set (rows R1, R2) of seismic sensor devices 30 are laid to a predetermined length, the second vessel 80, provided with the source device 85, is utilized to provide the source signal. The second vessel 80 can make eight or more passes along the two receiver lines to complete the seismic survey of the two rows R1 and R2.

While the second vessel 80 is shooting along the two rows R1 and R2, the first vessel 5 may turn 180 degrees and travel in the X direction in order to lay seismic sensor devices 30 in another two rows adjacent the rows R1 and R2, thereby forming a second set of two receiver lines. The second vessel 80 may then make another series of passes along the second set of receiver lines while the first vessel 5 turns 180 degrees to travel in the +X direction to lay another set of receiver lines. The process may repeat until a specified area of the seabed 55 has been surveyed. Thus, the idle time of the second vessel 80 is minimized as the deployment time for laying receiver lines is cut approximately in half by deploying two rows in one pass of the vessel 5.

Although only two rows R1 and R2 are shown, the sensor device 30 layout is not limited to this configuration as the ROV 35A may be adapted to layout more than two rows of sensor devices in a single directional tow. For example, the ROV 35A may be controlled to lay out between three and six rows of sensor devices 30, or an even greater number of rows in a single directional tow. The width of a "one pass" run of the first vessel 5 to layout the width of the sensor array can be limited by the length of the tether 46A or the spacing (distance LR) between sensor devices 30.

Figure 10:
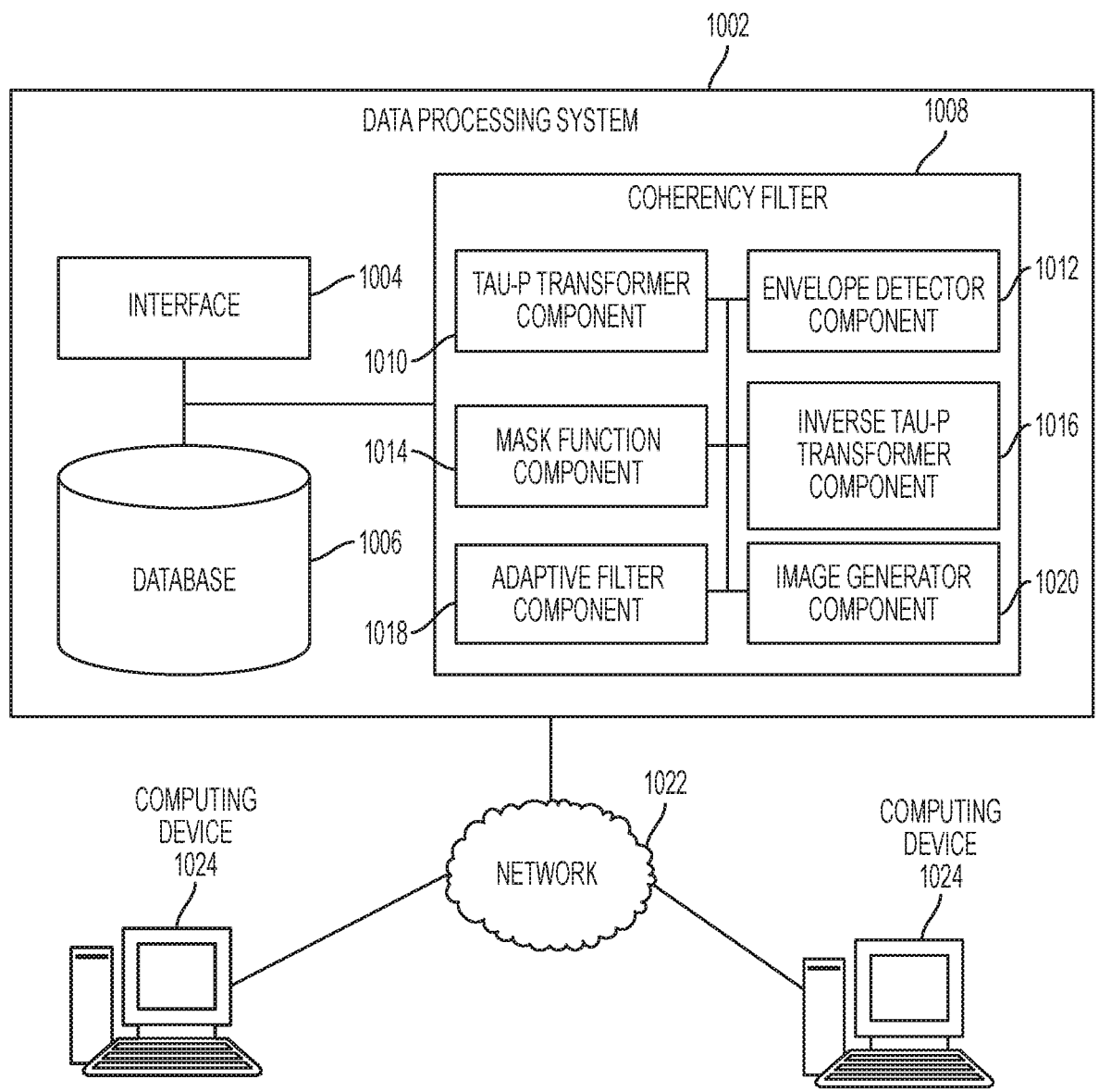
FIG. 10 depicts a system to perform a seismic survey, in accordance with an embodiment.

FIG. 10 illustrates a system to perform a seismic survey in accordance with an embodiment. The system 1000 can include a data processing system 1002. The data processing system 1002 can include one or more processors, memory, logic arrays, or other components or functionality depicted in FIG. 8. The data processing system 1002 can include or execute on one or more servers. The data processing system 1002 can include one or more servers in a server farm, or distributed computing infrastructure, such as one or more servers forming a cloud computing infrastructure. The data processing system 1002 can include at least one logic device such as a computing device 800 having one or more processors 810*a-n*.

The data processing system 1002 can include, interface or otherwise communicate with at least one interface 1004. The data processing system 1002 can include, interface or otherwise communicate with at least one database 1006. The data processing system 1002 can include, interface or otherwise communicate with at least one coherency filter 1008. The coherency filter 1008 can include, interface with or otherwise communicate with at least one tau-p transformer component 1010. The coherency filter 1008 can include, interface with or otherwise communicate with at least one an envelope detector component 1012. The coherency filter 1008 can include, interface with or otherwise communicate with at least one mask function component 1014. The coherency filter 1008 can include, interface with or otherwise communicate with at least one inverse tau-p transformer component 1016. The coherency filter 1008 can include, interface with or otherwise communicate with at least one adaptive filter component 1018. The coherency filter 1008 can include, interface with or otherwise communicate with at least one image generator component 1020.

The interface 1004, coherency filter 108, tau-p transformer component 1010, envelope detector component 1012, mask function component 1014, inverse tau-p transformer component 1016, adaptive filter component 1018, or image generator component 1020 can each include at least one processing unit or other logic device such as programmable logic array engine, or module configured to communicate with the database repository or database 1006. The interface 1004, database 1006, coherency filter 108, tau-p transformer component 1010, envelope detector component 1012, mask function component 1014, inverse tau-p transformer component 1016, adaptive filter component 1018, or image generator component 1020 can be separate components, a single component, or part of the data processing system 1002. The system 1000 and its components, such as data processing system 1002, can include hardware elements, such as one or more processors, logic devices, or circuits.

The data processing system 1002 can communicate with one or more computing devices 1024 via network 1022. The network 1022 can include computer networks such as the Internet, local, wide, metro, or other area networks, intranets, satellite networks, and other communication networks such as voice or data mobile telephone networks. The network 1022 can be used to access information resources such as seismic data, parameters, functions, thresholds, or other data that can be used to perform coherency filtering or improve the processing of seismic data to generate images with reduced aliasing or noise that can be displayed or rendered via one or more computing devices 1024, such as a laptop, desktop, tablet, digital assistant device, smart phone, or portable computers. For example, via the network 1022 a user of the computing device 1024 can access information or data provided by the data processing system 1002. The computing device 1024 can be located proximate to the data processing system 1002, or be located remote from the data processing system 1002. For example, the data processing system 1002 or computing device 1024 can be located on a vessel 5.

The data processing system 1002 can include an interface 1004 (or interface component) designed, configured, constructed, or operational to receive seismic data obtained via acoustic signals generated by at least one acoustic source and reflected from at least one subsurface lithologic formation. For example, an acoustic source device 85 depicted in FIG. 9 can generate an acoustic wave or signal that reflects from at least one subsurface lithologic formation beneath the seabed 55, and is sensed or detected by seismic sensor devices 30. The interface 1004 can receive the seismic data via a wired or wireless communication, such as a direct wired link or through a wireless network or low energy wireless protocol. The interface 1004 can include a hardware interface, software interface, wired interface, or wireless interface. The interface 1004 can facilitate translating or formatting data from one format to another format. For example, the interface 1004 can include an application programming interface that includes definitions for communicating between various components, such as software components. The interface 110 can communicate with one or more components of the data processing system 1002, network 1022, or computing device 1024.

The data processing system 1002 can include a coherency filter 1008 with a tau-p transformer component 1010 designed, constructed or operational to transform the seismic data to a tau-p domain. The tau-p domain can refer to a time-slowness domain. In the tau-p domain, the seismic data can be decomposed as a series of lines that map to points in the tau-p domain. While the tau-p domain may have less overlap between noise and the signal, the tau-p interpolation may contain aliased energy that can lead to high noise levels in an output. The coherency filter 1008 of the present solution can be configured to reduce the noise level while improving coherency, thereby generated improved graphs or images with the seismic data to improve the identification of subsurface lithologic formations, thereby improving the performance of a seismic survey.

The tau-p transformer component 1010 can obtain the seismic data in a time-offset domain and transform the seismic data into a new data set in the intercept time-slowness domain (e.g., tau-p or τ-p domain). In this case, the input data set (e.g., the seismic data) can be the observed seismogram wavefield. The transformed seismic data can be the horizontal slowness and tau can be the time intercept.

The tau-p transformer component 1010 can transform the input seismic data by decomposing the seismic data as a series of straight lines which map to points in the tau-p domain. Hyperbolic events (e.g. those in shot gathers) can map to elliptical curves in Tau-P. This process can be referred to as slant-stacking since to produce the tau-p domain the input data may be stacked along a series of straight lines. The tau-p transform can include a 3-dimensional least squares linear τ-p transform. The tau-p transformer component 1010 can solve a matrix having a block-circulant-circulant-block ("BCCB") structure, which the tau-p transformer component 1010 can be configured to utilize to increase the speed of a conjugate gradient solver. Further, the tau-p transformer component 1010 can utilize the least squares τ-p to improve amplitude fidelity compared to other 3-dimensional slant-stack techniques.

The tau-p transformer component 1010 can store the seismic data transformed to the tau-p domain in a data structure in database 1006 for further processing by the coherency filter 1008, data processing system 1002, or other component or device.

The coherency filter 1008 can separate the received input seismic data into one or more subsets, and perform processing on one subset at a time. Separating out the seismic data into subsets for processing can facilitate reducing noise and aliasing. For example, the tau-p transform can be applied in patches so that the events in the seismic data can appear approximately linear, which can reduce aliasing and noise, while increasing coherency, thereby improving the image generation or identification of subsurface lithologic formations. The coherency filter 1008 can separate the seismic data into 3-dimensional sub-volumes having a predetermined dimension, such as, for example, 10×10 traces (or some other number of traces). The coherency filter 1008 can then independently process each sub-volume. For example, the coherency filter 1008 can separate the set of seismic data into a plurality of subsets of seismic data, and select, for transformation to the tau-p domain, the first subset of seismic data from the plurality of subsets of seismic data.

Upon transforming the seismic data to the tau-p domain, the coherency filter 1008 can reduce or eliminate non-coherent or aliasing noise. To do so, the coherency filter 1008 can include an envelope detector component 1012. The envelope detector component 1012 can determine a tau-p envelope for the seismic data transformed to the tau-p domain. For example, the envelope of an oscillating signal can refer to a smooth curve outlining the extremes of the oscillating signal. The envelope can be an upper envelope or a lower envelope. For example, the envelope can be an upper envelope with values that are greater or equal to a default value, such as zero.

In some cases, the envelope detector component 1012 can normalize the tau-p envelope prior to selection of the threshold value based on the value identified on the tau-p envelope. Normalizing can refer to scaling all the values based on a ratio or factor. For example, the data can be normalized such that the values range between a first value and a second value. The data can be normalized such that there is a set minimum value or maximum value. FIG. 3 illustrates the tau-p envelope. FIGS. 7A-7C illustrate a normalized τ-px-py envelope for one block of 4-source blended data, in which aliasing and blending noise are distinguishable from the signal.

The coherency filter 1008 can identify a first value on the tau-p envelope. The coherency filter 1008 can identify the first value on the tau-p envelope that is a largest value on the tau-p envelope. For example, the first value can correspond to a position on the envelope. The value can be a τ-px-py position, as illustrated in FIGS. 3A-3H or FIGS. 7A-7C. The largest value can refer to a current max value on the tau-p envelope. As the coherency filter 1008 iterates through the loop, the coherency filter 1008 can select a next largest value for processing.

The coherency filter 1008 (e.g., via the mask function component 1014) can select a threshold value based on the identified first value on the tau-p envelope. The coherency filter 1008 can then select values that are on the tau-p envelope that are greater than or equal to the threshold. For example, the coherency filter 1008 can use a flood-fill technique to select the values on the tau-p envelope greater than or equal to the threshold. For example, the flood-fill technique can identify an area connected to a given node in a multi-dimensional array. In this case, the flood-fill technique can be used to identify values in the tau-p envelope that are greater than or equal to the threshold.

With these values, the coherency filter 1008 can identify a masking function that includes a first default value for the plurality of values selected on the tau-p envelope, and a second default value different from the first default value. The masking function can have a value of one for selected τ-p locations, and a value of zero elsewhere. For example, the first default value can be 1 and represent τ-p locations, while the second default value can be zero and represent other locations that are not τ-p locations.

The coherency filter 1008 can combine the seismic data in the tau-p domain with the masking function to generate combined seismic data. For example, the coherency filter can combine the tau-p transformed seismic data with the masking function. By multiplying (or otherwise combining or applying) the masking function to the seismic data that has been transformed to the tau-p domain, the coherency filter 1008 can reduce aliasing and noise, while distinguishing from the signal.

Subsequent to generation of the combined seismic data, the coherency filter 1008 can select a second value on the tau-p envelope that is a next largest value after the identified first value. In some cases, the coherency filter 1008 can increase a scale of the tau-p envelope to increase an amplitude of one or more events in order to select the second value such that the second value may be greater than or equal to the threshold.

The coherency filter 1008 can update the masking function based on the second value (e.g., by finding a new threshold value and selecting tau-p values greater than or equal to the threshold value). The coherency filter 1008 can iterate through this process until all coherent events have been selected. To reduce the number of tau-p transforms that need to be performed by the data processing system 1002, the coherency filter 1008 can perform this iteration in an inner loop that does not invoke the tau-p transformer component 1010 and the inverse tau-p transformer component 1016, thereby reducing processor and memory utilization.

The coherency filter 1008 can include an inverse tau-p transformer component 1016 designed, constructed and operational to perform an inverse tau-p transform to the combined seismic data (e.g., the masking function combined with the seismic data transformed in the tau-p domain) to generate an inverse combined seismic data. The inverse tau-p transform can utilize one or more parameters or be based on the forward tau-p transformer component 1010 such that the inverse can return the seismic data to the t-x domain from the tau-p domain.

The coherency filter 1008 can include an adaptive filter component 1018 designed, constructed and operational to apply an adaptive filter to the inverse combined seismic data to correct the plurality of values selected on the tau-p envelope and generate corrected seismic data. For example, the event amplitudes may have been affected due to processing the seismic data, such as by applying the a tau-p transform, envelope detection, or normalizing the envelope. Thus, the adaptive filter component 1018 can correct the amplitudes so that they correspond to amplitudes in the input seismic data. The adaptive filter component 1018 can adjust, via application of the adaptive filter to the inverse combined seismic data, one or more amplitude values (e.g., corresponding to the coherent events) of the inverse combined seismic data to correspond to one or more amplitude values of the seismic data obtained via the acoustic signals.

The coherency filter 1008 can identify one or more coherent events from the corrected seismic data that indicate one or more locations corresponding to a subsurface lithologic formation of the at least one subsurface lithologic formation. The coherency filter 1008 can include an image generator component 1020 designed, constructed or operational to generate a plot, graph, or image that indicates coherent events. The image generator component 1020 can generate the plot, graph or image with data that has been processed to varying degrees. For example, the image generator component 1020 can generate images as illustrated in FIGS. 2-7. The image generator component 1020 can further apply image processing technique to identify coherent events or indications of lithologic formations or hydrocarbon deposits. The indications of lithologic formations or hydrocarbon deposits can facilitate performing a further seismic survey or identifying subsea areas to explore or mine.

Figure 11:
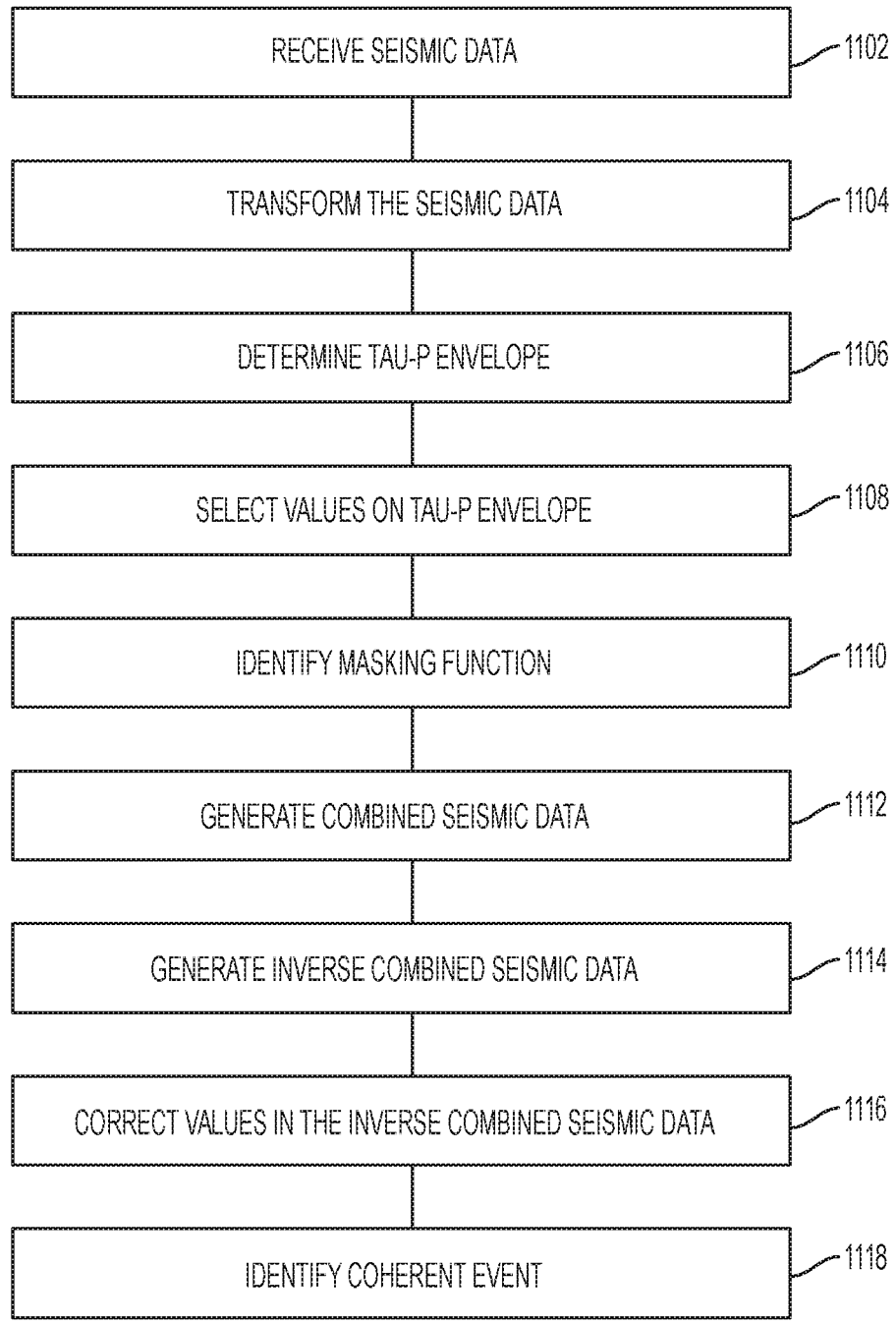
FIG. 11 depicts a method for performing a seismic survey, in accordance with an embodiment.

FIG. 11 is a method of performing a seismic survey. The method 1100 can be performed by one or more system or component depicted in FIG. 8 or FIG. 10. For example, a data processing system or coherency filter component can perform one or more function or process of method 1100. At ACT 1102, the data processing system can receive seismic data. The seismic data can be in the time offset domain or t-x domain. The seismic data can correspond to acoustic waveforms detected by an ocean bottom seismometer or other seismic data acquisition device.

At ACT 1104, the data processing system can transform the seismic data. The data processing system can transform the seismic data from a first domain into a second domain. For example, the data processing system can transform the seismic data into a tau-p or time-slowness domain. The tau-p domain can include the seismic data decomposed as a series of lines that map to points in the tau-p domain. The data processing system can transform some or all of the input seismic data into the tau-p domain. In some cases, the data processing system can transform subsets or patches of the seismic data. For example, the data processing system can split up the input seismic data into three-dimensional volumes that correspond to a number of traces.

At ACT 1106, the data processing system can determine a tau-p envelope. The tau-p envelope can correspond to an upper envelope or lower envelope of values in the tau-p domain. At ACT 1108, the data processing system can identify a first value on the tau-p envelope. The first value can be a largest value on the tau-p envelope. The data processing system can use a max function to detect or identify the first value on the tau-p envelope.

At ACT 1110, the data processing system can identify a masking function. For example, the data processing system can select a threshold value based on the first value identified on the tau-p envelope. The threshold value can be a predetermined threshold, or a threshold based on the selected first value. The threshold can be a fixed value or a dynamic value. The threshold can be a percentage or fraction of the first value. The threshold can be set by an administrator or user of the data processing system 1002, or stored in database 1004.

The data processing system can select a plurality of values on the tau-p envelope greater than or equal to the threshold. The data processing system can use these values to generate or update a masking function. The masking function can include a first default value (e.g., 1) for the plurality of values selected on the tau-p envelope, and a second default value (e.g., 0) different from the first default value or other points. The masking function can refer to a mask or data that can be used for bitwise operations to set or turn certain bits or values on or off.

At ACT 1114, the data processing system can combine the seismic data in the tau-p domain with the masking function to generate combined seismic data. For example, the data processing system can multiply, convolve, sum, or otherwise combine the masking function with the transformed seismic data to generated the combined, tau-p transformed seismic data.

At ACT 1116, the data processing system can perform an inverse tau-p transform to the combined seismic data to generate an inverse combined seismic data. The inverse tau-p transform can transform the combined seismic data from the tau-p domain into the time-offset domain or t-x domain.

In some cases, the data processing system can apply an adaptive filter to the inverse combined seismic data to correct the values selected on the tau-p envelope and generate corrected seismic data. The corrected values can correspond to coherent events.

At ACT 1118, the data processing system can identify one or more coherent events from the corrected seismic data that indicate one or more locations corresponding to a subsurface lithologic formation of the at least one subsurface lithologic formation. The coherent events can have amplitudes or values greater than a threshold. The coherent events may be the only non-zero values. The coherent values can correspond to local maxima in an image or graph.

Any references to implementations or elements or acts of the systems and methods herein referred to in the singular can include implementations including a plurality of these elements, and any references in plural to any implementation or element or act herein can include implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementations," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Elements other than 'A' and 'B' can also be included.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system to perform a seismic survey, comprising:
a data processing system comprising a coherency filter component, at least one processor, and memory, the data processing system to:
receive seismic data obtained via acoustic signals generated by at least one acoustic source and reflected from at least one subsurface lithologic formation;
select a threshold value based on a first value identified on a tau-p envelope;
select a plurality of values on the tau-p envelope greater than or equal to the threshold value;
identify a masking function comprising a first default value for the plurality of values selected on the tau-p envelope, and a second default value different from the first default value;
generate inverse combined seismic data from an application of an inverse tau-p transform to combined seismic data, the combined seismic data based on an application of the masking function to the seismic data in a tau-p domain;
apply an adaptive filter to the inverse combined seismic data to generate corrected seismic data; and
identify one or more coherent events from the corrected seismic data that indicate one or more locations corresponding to the at least one subsurface lithologic formation.

2. The system of claim 1, comprising:
the data processing system to transform the seismic data to the tau-p domain, the tau-p domain comprising the seismic data decomposed as a series of lines that map to points in the tau-p domain.

3. The system of claim 1, comprising the data processing system to:
- transform the seismic data to the tau-p domain, the tau-p domain comprising the seismic data decomposed as a series of lines that map to points in the tau-p domain; and
- determine the tau-p envelope for the seismic data transformed to the tau-p domain.

4. The system of claim 1, comprising:
- the data processing system to combine the seismic data in the tau-p domain with the masking function to generate the combined seismic data.

5. The system of claim 1, wherein the seismic data is a first subset of seismic data, the system comprising the data processing system to:
- receive a set of seismic data;
- separate the set of seismic data into a plurality of subsets of seismic data, the plurality of subsets of seismic data corresponding to 3D sub-volumes comprising a predetermined number of traces; and
- select, for transformation to the tau-p domain, the first subset of seismic data from the plurality of subsets of seismic data.

6. The system of claim 1, comprising:
- the data processing system to determine the tau-p envelope comprising values greater than or equal to zero.

7. The system of claim 1, comprising:
- the data processing system to normalize the tau-p envelope prior to selection of the threshold value based on the first value identified on the tau-p envelope.

8. The system of claim 1, comprising:
- the data processing system to identify the first value on the tau-p envelope that is a largest value on the tau-p envelope.

9. The system of claim 1, comprising the data processing system to:
- select, subsequent to generation of the combined seismic data, a second value on the tau-p envelope that is a next largest value; and
- update the masking function based on the second value.

10. The system of claim 1, comprising the data processing system to:
- subsequent to generation of the combined seismic data, increase a scale of the tau-p envelope to increase an amplitude of one or more events;
- select a second value on the tau-p envelope with the scale increased, the second value corresponding to a next largest value; and
- update the masking function based on the second value.

11. The system of claim 1, comprising:
- the data processing system to use a flood-fill technique to select the plurality of values on the tau-p envelope greater than or equal to the threshold value.

12. The system of claim 1, comprising;
- the data processing system to adjust, via application of the adaptive filter to the inverse combined seismic data, one or more amplitude values of the inverse combined seismic data to correspond to one or more amplitude values of the seismic data obtained via the acoustic signals.

13. The system of claim 1, comprising:
- the data processing system to generate an image indicating the one or more locations corresponding to the at least one subsurface lithologic formation.

14. A method of performing a seismic survey, comprising:
- receiving, by a data processing system, seismic data obtained via acoustic signals generated by at least one acoustic source and reflected from at least one subsurface lithologic formation;
- identifying, by the data processing system, a first value on a tau-p envelope;
- selecting, by the data processing system, a threshold value based on the first value identified on the tau-p envelope;
- selecting, by the data processing system, a plurality of values on the tau-p envelope greater than or equal to the threshold value;
- identifying, by the data processing system, a masking function comprising a first default value for the plurality of values selected on the tau-p envelope, and a second default value different from the first default value;
- generating, by the data processing system, inverse combined seismic data from an application of the masking function to the seismic data in a tau-p domain;
- applying, by the data processing system, an adaptive filter to the inverse combined seismic data to correct the plurality of values selected on the tau-p envelope and generate corrected seismic data; and
- identifying, by the data processing system, one or more coherent events from the corrected seismic data that indicate one or more locations corresponding to the at least one subsurface lithologic formation.

15. The method of claim 14, comprising:
- transforming, by the data processing system, the seismic data to the tau-p domain, the tau-p domain comprising the seismic data decomposed as a series of lines that map to points in the tau-p domain.

16. The method of claim 14, comprising:
- transforming, by the data processing system, the seismic data to the tau-p domain, the tau-p domain comprising the seismic data decomposed as a series of lines that map to points in the tau-p domain; and
- determining, by the data processing system, the tau-p envelope for the seismic data transformed to the tau-p domain.

17. The method of claim 14, comprising:
- combining, by the data processing system, the seismic data in the tau-p domain with the masking function to generate combined seismic data.

18. The method of claim 14, comprising:
- combining, by the data processing system, the seismic data in the tau-p domain with the masking function to generate combined seismic data;
- selecting, subsequent to generation of the combined seismic data, a second value on the tau-p envelope that is a next largest value; and
- updating the masking function based on the second value.

19. The method of claim 14, wherein the seismic data is a first subset of seismic data, the method comprising:
- receiving a set of seismic data;
- separating the set of seismic data into a plurality of subsets of seismic data, the plurality of subsets of seismic data corresponding to 3D sub-volumes comprising a predetermined number of traces; and
- selecting, for transformation to the tau-p domain, the first subset of seismic data from the plurality of subsets of seismic data.

20. The method of claim 14, comprising:
- normalizing the tau-p envelope prior to selection of the threshold value based on the first value identified on the tau-p envelope.

* * * * *